(12) United States Patent
Nazarenko et al.

(10) Patent No.: US 12,187,874 B2
(45) Date of Patent: Jan. 7, 2025

(54) FLAME-RETARDANTS COMPRISING SOLUBLE FLAME-RETARDANT METAL COMPOUNDS

(71) Applicants: Sergei Nazarenko, Hattiesburg, MS (US); Robert Y. Lochhead, Hattiesburg, MS (US); Vivek Vasagar, Gibsonia, PA (US)

(72) Inventors: Sergei Nazarenko, Hattiesburg, MS (US); Robert Y. Lochhead, Hattiesburg, MS (US); Vivek Vasagar, Gibsonia, PA (US)

(73) Assignee: University of Southern Mississippi, Hattiesburg, MS (US)

(*) Notice: Subject to any disclaimer, the term of this patent is extended or adjusted under 35 U.S.C. 154(b) by 628 days.

(21) Appl. No.: 17/044,227

(22) PCT Filed: Mar. 30, 2019

(86) PCT No.: PCT/US2019/025065
§ 371 (c)(1),
(2) Date: Sep. 30, 2020

(87) PCT Pub. No.: WO2019/191732
PCT Pub. Date: Oct. 3, 2019

(65) Prior Publication Data
US 2023/0174745 A1 Jun. 8, 2023

Related U.S. Application Data

(60) Provisional application No. 62/650,853, filed on Mar. 30, 2018.

(51) Int. Cl.
*C08K 5/17* (2006.01)

(52) U.S. Cl.
CPC .................................. *C08K 5/175* (2013.01)

(58) Field of Classification Search
CPC ...................................................... C08K 5/175
See application file for complete search history.

(56) References Cited

U.S. PATENT DOCUMENTS

| 4,310,444 A * | 1/1982 | Hamada | C08K 5/09 524/400 |
| 2006/0270779 A1* | 11/2006 | Mochizuki | C08L 67/04 524/500 |
| 2013/0046036 A1* | 2/2013 | Lebel | C08K 7/06 524/130 |
| 2014/0248813 A1* | 9/2014 | Bolze | C08G 18/6677 442/179 |

FOREIGN PATENT DOCUMENTS

WO   WO 2013/116283   *   8/2013

\* cited by examiner

*Primary Examiner* — Doris L Lee
(74) *Attorney, Agent, or Firm* — Mendelsohn Dunleavy, PC

(57) ABSTRACT

The invention provides for metal-based flame-retardants that are soluble in flammable or combustible materials and methods for preparation. The flame-retardants of the invention are also effective in reducing the rate of heat, smoke, CO, and $CO_2$ release.

20 Claims, 27 Drawing Sheets

Epoxy resin with no flame retardant additive

Epoxy resin with Zinc Oxide flame retardant additive

Epoxy resin with Zinc Borate flame retardant additive

Zinc Acrylate Zinc Acetate Zinc Undecylate

Zinc Citrate Zinc Stearate prepared at room temperature Zinc Stearate prepared at 90 degrees Celsius

FLAME-RETARDANTS COMPRISING SOLUBLE FLAME-RETARDANT METAL COMPOUNDS

CROSS-REFERENCE TO RELATED APPLICATION

This application claims priority from U.S. Provisional Patent Application Ser. No. 62/650,853 filed Mar. 30, 2018. The entirety of the provisional application is incorporated herein by reference.

FIELD OF THE INVENTION

The present invention relates to flame-retardant compositions and to methods for preparing them. Specifically, the present invention relates to metal-based flame-retardants that are soluble in flammable materials. The metal-based flame-retardants of the present invention encompass a range of metal compounds that can be added as flame-retardants to a wide range of materials including, for example, polymers such as epoxy resins, polyurethanes, polystyrene, polycarbonate, and polyethylene oxide. Superior flame-retardant performance results when the metal compounds are soluble in the flammable or combustible materials. The metal-based flame-retardants of the invention are effective in reducing the rate of heat, smoke, carbon monoxide (CO), and carbon dioxide ($CO_2$) release.

BACKGROUND OF THE INVENTION

The present invention relates to metal-based flame-retardant compositions that are soluble in flammable materials and are effective in reducing the rate of heat, smoke, carbon dioxide and carbon monoxide release. The invention further provides for methods of preparing such novel flame-retardant compositions.

Polymeric materials are used extensively because of their superior properties such as low density and durability, combined with low cost and ease of fabrication. However, in general, synthetic polymeric materials are flammable and can be more flammable than natural materials such as cotton or wood. Once ignited, the combustion of polymers is sustained by decomposition of the solid polymer into smaller fragments and flammable gases which continue to combust as long as an oxygen source is available. The Earth's atmosphere provides an abundant supply of oxygen to support such combustion. This combustion releases more heat which is radiated into the unburned material, causing it to continue to burn until there is insufficient combustible material, oxygen, or heat to sustain the burning process. Polymeric materials can be the first items to catch fire, and once ignited, they are likely to continue to burn and initiate fire in other combustible materials in their vicinity.

Heat, smoke, and toxic gases which are released during a combustion process are significant fire hazards and the heat released can cause fast ignition and flame spread. Thus, controlling the flame intensity is an important factor in retarding the spread of a fire. Fire is a hazard that is associated with injury, loss of life, and loss of property. Therefore, it is desirable to retard or prevent the flammability of flammable materials. Smoke can hinder escape from the scene of a fire and also prevent the entry of firefighters. Reductions in smoke emissions during fire events are therefore desirable.

The use of flame-retardant materials to reduce the heat release and toxic smoke, is a vital part of the development and application of new materials. Flame-retardants do not necessarily make materials "fire proof". The use of flame-retardants in flammable materials delays the time of fire flashover and, in some cases, can result in materials that are difficult to ignite or re-ignite. Fire safety standards of fabricated items often require the use of flame-retardants within the materials of construction to pass regulatory fire safety tests.

Flame-retardant materials are sought in applications such as heat insulating and sound insulating materials, textiles, fabrics and coverings, printing media, adhesives, films, coatings, varnishes, electronic devices, wire and cable coatings and insulation, articles comprising plastics, polymer composites, building materials, and the like. The present invention is directed to such applications but is not limited to those applications listed herein.

A need exists for transparent flame-retardant materials for windows, lenses, clear coats, varnishes, coatings and finishes, wire and cable insulation, apparel, and other such applications that require both flame retardancy and optical transparency. A need also exists for flame-retardants that exhibit reduced health hazards and that provide ecological friendliness. The present invention is further directed to but not limited to such applications listed herein.

Two approaches to achieve flame retardancy in flammable materials are the 'additive' approach and the 'reactive' approach. Additive flame-retardants are incorporated into materials by physical mixing. This approach is generally the most economical and expeditious way to provide flame retardancy. However, the additive approach has several drawbacks, such as poor compatibility, leaching of the flame-retardant during product lifetime, and degradation of mechanical properties. Another approach is the reactive approach, whereby the flame-retardant moieties are chemically bound to the flammable material.

The model for burning assumes independent pyrolysis and flame zones. Heat transfer from the flame provides coupling between the gas phase and the condensed phase. It drives the thermal degradation reactions that produce volatile fuel fragments that, in turn, feed the flame. This model suggests three possible strategies for retarding flame in combustible materials: (i) interference with the gas phase combustion; (ii) interference with the substrate pyrolysis reactions; or (iii) decoupling the flame from the fuel and oxygen via a physical barrier to heat and mass transport.

Currently, many flame-retardants act either in the vapor phase or the condensed phase through a chemical and/or physical mechanism to interfere with the combustion process during heating, pyrolysis, ignition, or flame spread stages. Halogen-containing species, and some phosphorus-containing and antimony-containing flame-retardants, act in the vapor phase by capturing free radicals and thereby interrupting the exothermic oxidative flame chemical processes and thus suppressing combustion. Phosphorus-containing species can also act in the condensed phase promoting char formation on the surface of the burning material to form a barrier that inhibits further degradation, hindering the diffusion of gaseous species to the flame, starving the flame of fuel, and protecting the surface of the flammable material from heat and air.

Hydrated fillers, typically particulate magnesium hydroxide or aluminum trihydrate, release non-flammable gases or decompose endothermically to cool the pyrolysis zone or dilute the flammable gases at the combustion surface. Another major category of flame-retardants are intumescents which swell when exposed to fire or heat to form a porous foamed carbonaceous char. The expanded char acts as a barrier to heat, air, and pyrolysis products.

In summary, three principal mechanisms of flame-retardant chemistries are available today: those that act in the vapor phase, those that function by quenching surface pyrolysis, and those that form physical barriers between the combusting material and surrounding air. These mechanisms are dubbed gas phase flame-retardants, endothermic flame-retardants, and char-forming flame-retardants, respectively. Some flame-retardants also operate by a combination of these mechanisms.

Gas phase flame-retardants are exemplified mainly by halogenated flame-retardants and some phosphorus-based flame-retardants, so long as they become volatile during pyrolysis. In the former class of halogenated flame-retardants, organochlorine and organobromine compounds are used most, with organobromine being, by far, the most commonly used. In such halogenated fire-retardant compounds, the carbon-halogen bond is essentially stable during ambient conditions but becomes unstable in the heat of a fire. The instability, when heated by a fire, releases the halogen to inhibit the free radical reactions that would otherwise sustain combustion-Halogenated flame-retardants are sometimes combined with synergists, such as antimony oxide, zinc borate, or phosphorus compounds to enhance the efficiency of the released halogens in the vapor phase.

Halogen-based compounds are well-established as flame-retardant compounds. Halogenated flame-retardants do suffer from disadvantages that include an increase in smoke and release of corrosive gases and toxic by-products during burning. Moreover, these compounds can diffuse or leach out from materials into the environment where they become persistent organic pollutants. Halogen-containing flame-retardants are legislatively inhibited in numerous application fields due to their environmental impact and hazard to human health. Thus, halogen-free flame-retardants have been sought for a number of years.

Halogenated organic phosphates have been widely used as flame-retardants in organic compositions, often in combination with various synergists. However, concern exists regarding the generation of smoke and toxic gases which are evolved from these flame-retardants during a fire. While these classic fire-retardants may be effective combustion suppressants, the toxic gases they form and emit pose a threat to human exposure.

Phosphorus-based flame-retardants include phosphates, organophosphorus compounds, and elemental red phosphorus. Phosphorus compounds can act as gas-phase or condensed phase flame-retardants that form insulating chars, depending upon their chemical structure and their interaction with particular flammable materials. For example, when incorporated into polycarbonate/acrylonitrile-butadiene-styrene blends, resorcinol bis(diphenyl phosphate) shows mainly a gas phase action and some condensed phase action, whereas bisphenol A bis(diphenyl phosphate) shows a condensed phase action in addition to a gas phase action. For epoxy resins containing phosphine oxide, phosphinate, phosphonate, and phosphate, as the oxidation state of the phosphorus increases, additional charring is observed and flame inhibition decreases.

Organophosphorus flame-retardants are often reactive-types that are chemically bonded to flammable materials. This class of phosphorus-containing compounds typically performs its flame-retardant function in the condensed phase, promoting char formation on the surface. Two char-forming mechanisms are: (i) redirection of the chemical reactions of combustion to those reactions that yield carbon rather than CO or $CO_2$; and (ii) formation of a surface layer of protective char which functions as a barrier to inhibit further degradation and starve the flame of fuel to protect the surface of the combusting material from heat and air. The reactive type organophosphorus flame-retardants can be broadly divided into three categories: simple reactive phosphate monomers; linear polyphosphazenes; and aromatic cyclic phosphazenes.

Phosphorus-based flame-retardants have deficiencies in that they are sometimes ineffective for some styrenic and polyolefin polymers. As a consequence of their inhibition of combustion, phosphorus-based fire retardants generate relatively large amounts of smoke and carbon monoxide in fire situations. Flame-retardants based on halogens, and organic or inorganic phosphorus compounds, have come under scrutiny in recent years because they are suspected of harming human, animal, and environmental health. Borates and boric acid are flame-retardants which act in the condensed phase by favoring carbon formation rather than formation of CO or $CO_2$. The postulated mechanism of boron compounds is the formation of a surface layer of protective char, which acts as a barrier to the access of oxygen to prevent the oxidation of carbon. Boron compounds are also synergistic with halogenated flame-retardants and are useful in reducing after-glow.

Historically, the oldest flame-retardant besides water has been a nitrogen-phosphorus compound, namely ammonia phosphate, which Gay-Lussac introduced to improve the safety of candle-illuminated Parisian theaters. Nitrogen containing compounds are used alone or as synergistic materials to improve the flame retardancy of flammable materials.

An important organic nitrogen compound used as a flame-retardant is melamine. U.S. Pat. Nos. 3,915,777, 4,010,137, and European Patent A-782599 describe the use of melamine-based compounds as flame-retardant compounds. Melamine is a common component in intumescent varnishes or paints. Intumescent flame-retardants operate by forming an expanded char layer that insulates the underlying structure from the heat of the fire and restricts the supply of oxygen to the burning surface. Intumescent flame-retardants typically contain three components, namely an acid catalyst, a carbon source, and a spumific or gas former. The catalyst causes the carbon source to crosslink during combustion. The spumific causes the char to form a foam. Exemplary intumescent compositions comprise ammonium phosphate as the acid source, pentaerythritol as the carbon source, and melamine as the spumific. Expandable graphite is also used as an intumescent. Intumescents are typically applied as coatings to protect underlying structures such as fire barriers, or steel structures for a period of time during a fire event. Intumescents are designed to activate at relatively low temperatures, typically in the range of 180° to 240° C. This characteristic limits their use to lower temperature materials and fire protection barriers. The fabrication of thermoplastics usually requires temperatures higher than the activation temperatures of intumescents. As a consequence, intumescents cannot typically be used to impart flame retardancy to thermoplastic materials. Moreover, although intumescents reduce hazards during pyrolysis and combustion by retarding a fire, they nevertheless can generate large amounts of smoke and can also present ecological threats. U.S. Pat. No. 8,372,899 claims that enhanced flame-retardant performance and reduced smoke emission can be achieved by combining particulate flame-retardant materials with a particulate material that expands upon the application of heat. The particulate flame-retardant material claimed in that disclosure can be any number of listed compounds or a complex thereof.

European Patent A6568 describes the use of nitrogen-containing compounds such as melamine and dicyanamide in combination with alkali metal salts of phosphinic acids as synergists to improve flame retardancy. German Patent 19614424, German Patent-A-19734437, European Patent-A-19737727, and World Intellectual Property Organization WO-A-97/39053 describe the use of phosphinic acid and diphosphinic acid in combination with nitrogen-containing compounds to impart flame-retardant properties on polyester-based resins.

The use of metal ammine complexes as flame-retardant additives for polyurethane foams has been described in U.S. Pat. No. 3,661,809. The ammine metal complexes are complexes of metal with ammonia and are not complexes with organic amines. The metal-ammine complexes have decomposition temperatures of about 1000 to 500° C. and they release ammonia upon decomposition. The decomposition is endothermic and the heat absorbed lowers the temperature and the released non-flammable ammonia is postulated to snuff off the flame.

Mineral filler flame-retardants are predominantly metal hydroxides or carbonates, examples of which are alumina trihydrate, magnesium hydroxide, magnesium carbonate, and calcium carbonate. When heated in a fire, these mineral filler retardants decompose to release water or carbon dioxide, and this cools the condensed phase, slowing the thermal decomposition of the flammable material. Compared to halogenated compounds and phosphorus-based flame-retardants, mineral fillers offer the advantages of lower smoke and toxic gas emission during a fire. However, they are effective only within a limited temperature range, because once the available water/carbon dioxide has been exhausted, the cooling effect is also exhausted and the retardation of the fire ceases. The low activity of metallic hydroxides requires high concentrations which can compromise the physical and mechanical properties of the materials to which they are applied. For example, polyolefin wire and cable compounds often need 50 to 70 weight percent of mineral filler to meet the flame-retardant properties that are mandated by regulations. Additionally, on decomposition, magnesium hydroxide forms a powdery residue with a high surface area. The powdery residue tends to catalyze oxidation of char residues leading to an afterglow effect, necessitating the addition of other compounds to form an effective barrier layer during combustion.

U.S. Pat. No. 5,422,092 describes the use of hydroxides of aluminum and magnesium as flame-retardant additives. Since the metal hydroxide decomposes at higher temperature than that of organic polymers and has no release of toxic smoke, it is used as flame-retardant material for various resins. WO2004074359 describes the use of group 4A metal oxides as possible flame-retardant materials for epoxy thermosets used in electrical wiring applications. U.S. Pat. No. 5,274,017 demonstrates various metal oxides based on aluminum, magnesium, lithium, lanthanum, and bismuth as flame-retardant materials for aromatic carbonate materials.

Inorganic flame-retardants are limited in their effectiveness in the sense that they need a high loading to have a considerable impact on the flame retardancy, and the high loadings generally affect the mechanical performance of the polymeric material. A need exists for flame-retardant materials, which can be added in small quantities and which can reduce toxic gas and heat release, without deleteriously affecting the mechanical performance of materials, particularly for flammable polymeric materials. The present invention provides such compositions and methods.

Polymer nanocomposites are polymers with nanoscale particles dispersed therein in sufficient quantity to cause most of the polymer to interact with the nanoparticulate surfaces. Nanocomposites are condensed phase flame-retardants that slow the mass loss of polymer during combustion and thereby spread the heat release over a longer time period and, as a consequence, make the fire burn with less intensity. Qiao et al., demonstrates the importance of dispersing inorganic metal hydroxides to improve flame retardancy using nanoscale magnesium hydroxide. In Qiao's study, the size and the uniformity of the inorganic particles were shown to improve the flame retardancy of flammable polymeric systems. Polymer nanocomposites do retard flame growth, but Morgan and Gilman opine that they need to be combined with other traditional flame-retardants to pass mandatory regulatory tests for flame retardancy.

Recent studies demonstrated the use of hydrated zinc acetate and cobalt acetate microparticulates as effective flame-retardant materials for epoxy-amine systems. It has been postulated that the use of these hydrated metal salts was effective for two reasons, namely, the water released during burning cooled the combustion process, and the metal acetates formed a metal oxide inorganic layer hindering the fire and slowing its propagation.

Organometallic and inorganic transition metal compounds have been used as additive flame-retardants. It has been reported that Mg, Cr, Mn, Sn, Ba, and U reinforce the recombination of hydrogen atoms inside fuel-rich mixtures, whereas the metals Na, Co, Ni, Cu, V, Zn, Ga, Th, Ge, and La are not as effective, while Ca, Sb, Pb, Ti, and Si compounds display inhibitor activity. The flame retardancy of styrene-maleic anhydride copolymer can be enhanced using titanate grafted on the copolymer chain by amido and imido linkages, to promote flame retardancy via char forming. The resulting high char material is attributed to the titanium, the imide group and bridge building in the polymeric system.

Ferrocene-modification of block copolyurethanes resulted in higher thermal stability, a 40-80% reduction in peak heat release rate, and enhanced char formation upon combustion. Also, fatty acids and the magnesium and zinc salts of fatty acids can be utilized as lubricants, surface treatments, and compatibilizing agents for particulate flame-retardants.

Combinations of flame-retardant compounds with metal-based compounds can improve flame-retardant performance. Halogenated compounds in combination with metals promote charring behavior of the polymer and the resulting char enhances the flame-retardant properties.

Metal-based compounds in combination with phosphoric acid have been established as flame-retardant materials for various polymers. For example, alkali metal salts of phosphinic acids, with a loading of 30 wt %, have been studied as flame-retardant materials for polyolefins as described in DE-A-2252258. Also, DE-A-2447727 describes the use of metals from Periodic Table second or third row elements along with phosphinic acids to form metal salts as flame-retardant materials. EP-A699708 has shown the use of calcium and aluminum phosphinates as flame-retardant materials. U.S. Pat. No. 3,943,075 discloses the use of phosphoramidate esters of dibromo-neopentyl glycol as flame-retardant additives. U.S. Pat. No. 4,041,012 describes the use of acrylate esters of dihaloneopentyl glycol phosphates as flame-retardant additives. U.S. Pat. No. 4,049,617 discloses a flame-retardant additive using 5,5-bis(bromomethyl)-2-hydroxy-2-oxo-1,3,2-dioxaphosphorinane.

Nitrogen-containing flame-retardants are regarded as being environmentally-friendly because they are less toxic, reduce smoke emission, and do not emit dioxin or halogen acids by-products during combustion. The inclusion of an —NH— linkage in macrocyclic polymers and their metal complexes confers better flame-retardant properties. The presence of metals (Cu, Co and Ni) in the co-ordination sphere of these macrocyclic polymers increases the thermal stability and decreases the thermal-oxidative degradation.

Patent Cooperation Treaty PCT/European Patent 97/01664 describes a method to increase flame retardancy by adding melamine and cyanurate based compounds as synergistic additives in combination with metal salts. U. S. Patent Application No. 20060138391 discloses the use of phosphoric acid metal salts of magnesium and aluminum as flame-retardant additives in combination with melamine-based compounds.

In glass fiber-reinforced poly(butylene terephthalate), aluminum phosphinate, or aluminum phosphinate in combination with melamine cyanuronate, results in a small amount of thermally stable carbonaceous char upon combustion, whereas zinc phosphinate, or zinc phosphinate in combination with melamine cyanuronate, does not produce a thermally-stable char. Aluminum phosphinate or aluminum phosphinate in combination with melamine cyanuronate fulfill the requirements for electrical engineering and electronics applications, whereas the use of the same amount of zinc phosphinate or zinc phosphinate in combination with melamine cyanuronate does not improve the fire behavior satisfactorily. The aluminum phosphinate results in a small amount of thermally-stable carbonaceous char. U.S. Pat. No. 4,049,617 explains the use of polyvalent metal or amine salts of 5,5-bis(bromomethyl)-2-hydroxy-2-oxo-1,3,2-dioxaphosphorinane as flame-retardant additives. The polyvalent metals contemplated for use in these flame-retardants include aluminum, calcium, magnesium, barium, chromium, strontium, silver, titanium, nickel, copper, zinc, iron, cobalt, manganese, molybdenum, zirconium, cadmium, bismuth, lead, tin, vanadium, and antimony. Aluminum and calcium salts are preferred. The amine preferably is an amino-s-triazine and melamine is preferred.

The nitrogen-based compound, piperazine, has been used with metal salts of phosphinic acid as a synergistic flame-retardant additive. U.S. Pat. No. 9,221,961 describes the use of a 10 to 60 weight percent flame-retardant blend containing 1 to 80 weight percent of metal-based compounds of either piperazine diphosphate or piperazine pyrophosphate, and 10 to 80 weight percent of melamine-based compounds as flame-retardants. WO 2009080554 describes the use of sterically-hindered amine in combination with metal salt of hypophosphorous acid along with an organo-halogen as a synergistic composition for reducing flammability. A wide range of polymers such as polymers derived from unsaturated alcohols and amine, acyl derivate and acetals were tested for flame-retardant behavior using this additive. EP1422261 describes the use of tetrazole compounds in conjunction with a metal salt or an amine salt from 1 to 50 parts to impart flame-retardant behavior on a thermoset resin. The average particle size of the flame-retardant material in that instance is less than 100 µm. The release of nitrogen during combustion is described as the flame-retardant mechanism.

U.S. Pat. No. 3,705,128 describes the use of halogenated amide metal salts as flame-retardant additives. If the polymer does not inherently contain halogen, the amide complex should be added with a source of halogen to give the required flame retardancy. U.S. Pat. No. 3,804,800 describes the use of metal salts of zinc chloride—N-methyl-pyrrolidone as flame-retardant additives and requires the presence of a source of halogen to give effective flame retardancy. U.S. Pat. No. 5,364,899 claims flame-retardant resin compositions are achieved in polycarbonate/ABS polymers by inclusion of zinc carboxylates combined with glass fibers, silicones or polytetrafluoroethylene. Copolymers of pentabromobenzylacrylate and metal acrylates are disclosed as flame-retardants. U.S. Pat. No. 4,212,649 claims a method for manufacturing heat-resistant and flame-retardant poly (vinyl chloride) fibers by grafting poly(calcium acrylate) to the poly(vinyl chloride).

The flame retardancy of flammable polymeric materials can be improved by the addition of silicones. U.S. Pat. No. 4,273,691 discloses that combinations of silicone gums and certain carboxylic acid salts of Group IIA elements impart flame-retardant properties to a variety of organic polymers. Combinations of aluminum hydroxide, silicone compounds, and fatty acid salts are presumed to form barrier layers that suppress polyolefin combustion. Metal stearates, preferably calcium and magnesium stearate, are disclosed as flame-retardant aids that are used with inorganic particulate flame-retardants, aluminum hydroxide, magnesium hydroxide, calcium hydroxide, and silicone flame-retardants for polyolefin cable sheaths. The decomposition onset temperature of the particulate material is lower than the decomposition onset temperature of the silicone, which is lower than the decomposition onset temperature of the polyolefin.

Zinc compounds such as oxides, borates, stannates, and hydroxystannates, can be dispersed in poly(vinyl chloride) and epoxy resins as flame-retardants and smoke suppressants. Zinc hydroxystannate releases water during combustion and this enhances its flame-retardant effect. Zinc hydroxystannate in an epoxy matrix reduces the overall emissions of CO and $CO_2$. However, the zinc hydroxystannate-containing system produces carbon monoxide as a major reaction product of the incomplete combustion of volatiles to the end of a fire.

Combinations of zinc borate and magnesium hydroxide show synergies in the reductions of heat release and smoke evolution and promote the formation of strong char residues. Zinc borate and red phosphorus are claimed to act as flame-retardant synergists with magnesium hydroxide in ethylene vinyl acetate copolymer.

A need exists for new improved flame-retardants that suppress flammability, smoke levels, carbon dioxide, and toxic gas emissions during combustion. The present invention provides such compositions and provides methods for forming such compositions, none of which pose harm to health or to the environment.

SUMMARY OF THE INVENTION

The present invention relates generally to novel flame-retardants comprising soluble flame-retardant metal compounds and methods of preparation of such flame-retardants. It was discovered unexpectedly that solubility, rather than dispersion, of metal entities in flammable materials improves flame retardancy and greatly reduces the emission of heat, smoke, carbon monoxide, carbon dioxide, and toxic gas during combustion of a broad range of flammable materials. The observed improvement in flame retardancy, and improvement in the reduction of emissions of carbon dioxide and toxic gases, can be achieved even in the absence of halogenated, phosphorus-containing, or boron-containing compounds. Dissolving the metal entities in flammable materials was achieved directly by selection of metal compounds or complexes that were soluble within the flammable material. The metal entities of the compositions of the present invention confer enhanced flame-retardant properties on flammable or combustible materials when the metal moiety is soluble throughout the flammable or combustible material. The methodology of the invention can be applied universally for various flammable materials by choosing the metal, metal compound, and/or metal complex to confer solubility in a preferred flammable material.

In addition to imparting flame retardancy, the soluble metal moieties can impart flexibility to polymeric materials, which is important in many applications. Solubility was detected by transparency of the compositions comprising metal compounds within transparent flammable materials or by loss of detected crystal structure of the metal compounds upon dissolving in the flammable polymeric material. Loss of crystal structure can be detected by comparative x-ray diffraction measurements. Soluble metal compounds can also be sought by matching fractional solubility parameters of a metal compound with a flammable material.

With the foregoing and other objects, features, and advantages of the present invention that will become apparent hereinafter, the nature of the invention may be more clearly understood by reference to the following detailed description of the preferred embodiments of the invention and to the appended claims.

BRIEF DESCRIPTION OF THE DRAWINGS

These drawings accompany the detailed description of the invention and are intended to illustrate further the invention and its advantages. The drawings, which are incorporated in and form a portion of the specification, illustrate certain preferred embodiments of the invention and, together with the entire specification, are meant to explain preferred embodiments of the present invention to those skilled in the art. Relevant FIGURES are shown or described in the Detailed Description of the Invention as follows.

Resin 826)+Jeffamine® D230. All of the metal compounds were prepared using dibutylamine as the amine raw material.

Figure 21:
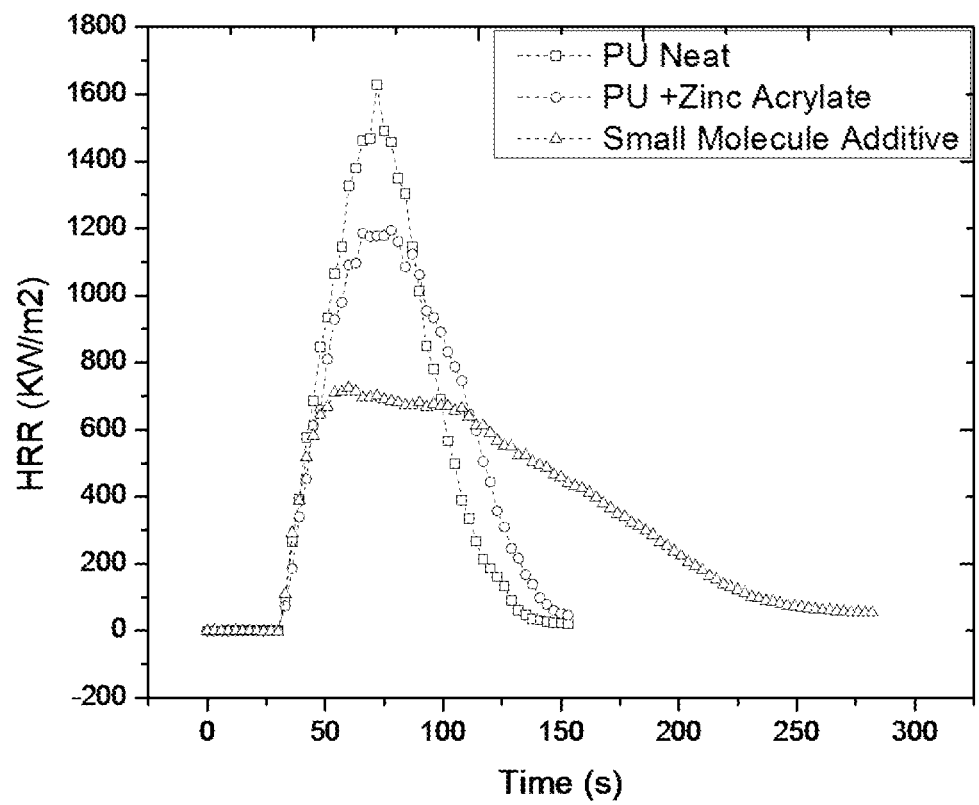

FIG. 21 shows a graphical illustration of the cone calorimeter measurements of the effect of the reaction product of dibutylamine and zinc acrylate on the flammability of polyurethane prepared from stoichiometric ratios of polyol and isocyanate.

Figure 22:
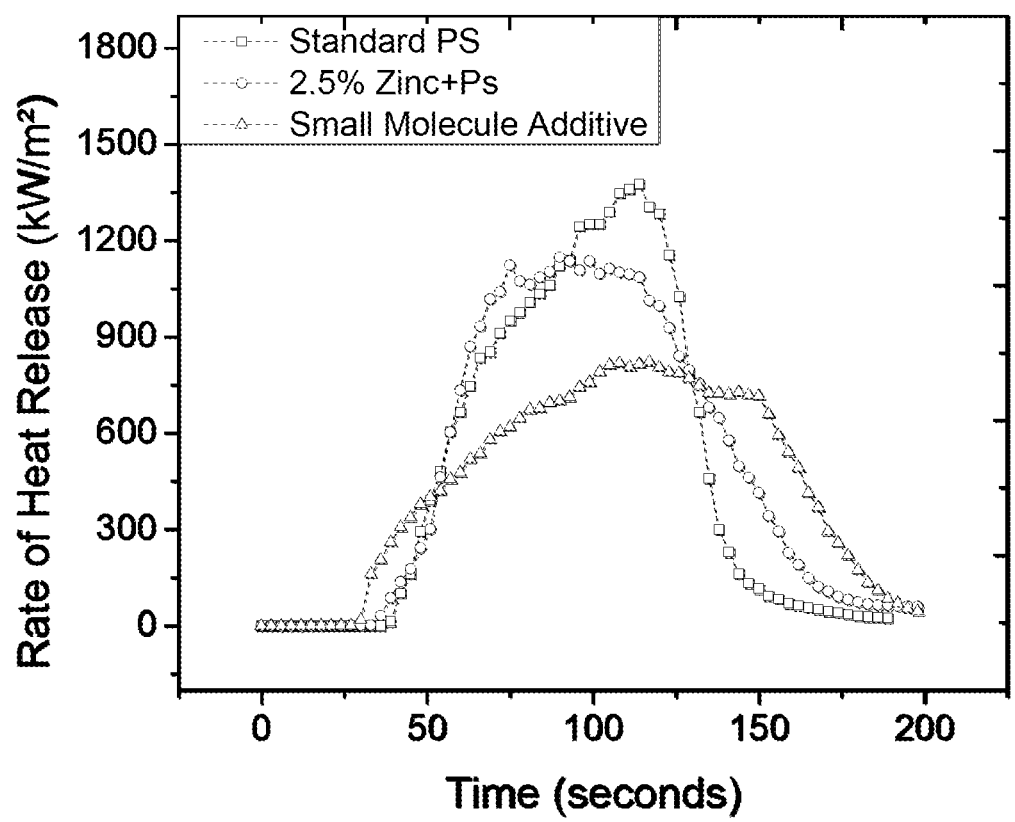

FIG. 22 shows a graphical illustration of the cone calorimeter measurements that show the effect of the reaction product of dibutylamine and zinc acrylate on the flammability of polystyrene.

Figure 23:
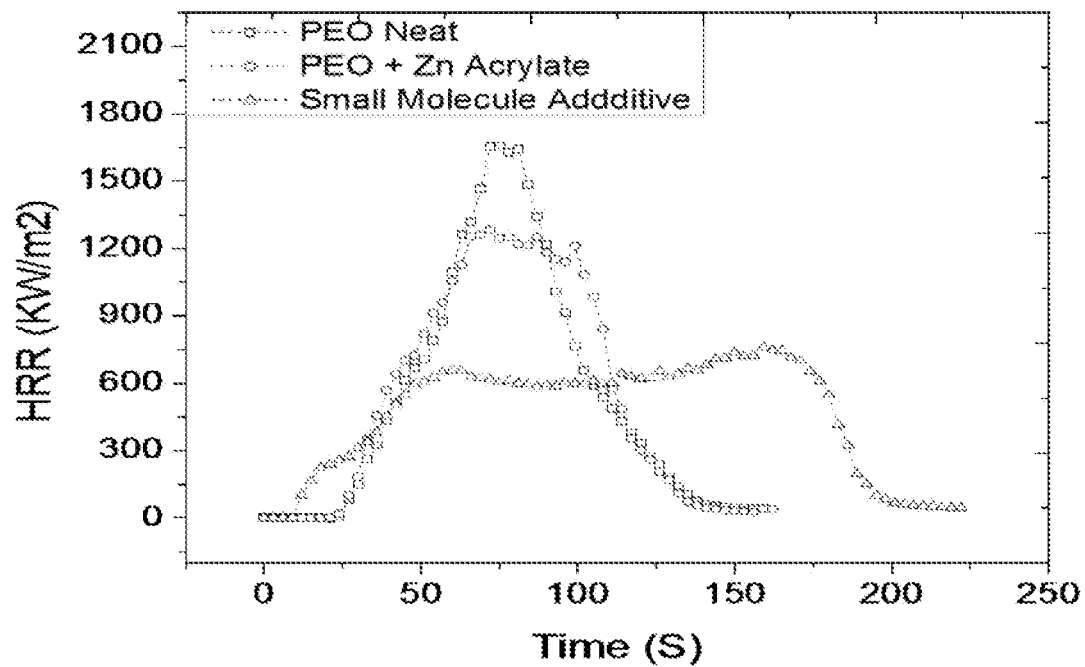

FIG. 23 shows a graphical illustration of the cone calorimeter measurements that show the effect of reaction product of ethylenediamine and zinc acrylate on the flammability of poly(ethylene oxide).

Figure 24:
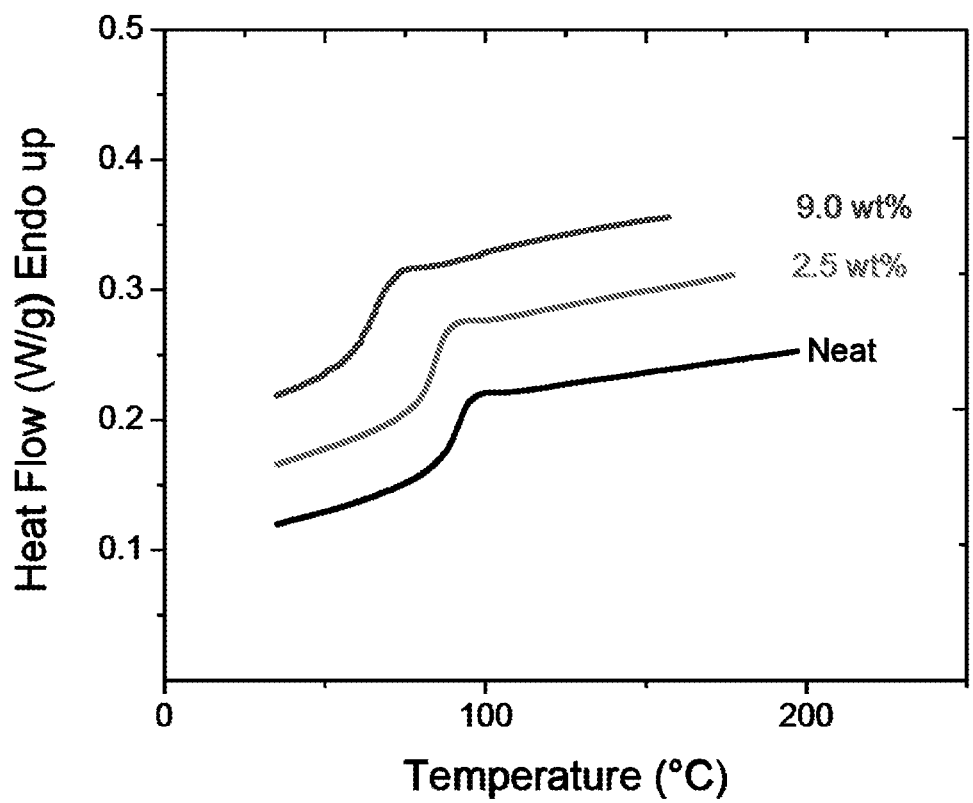

FIG. 24 shows a graphical illustration of the Differential Scanning Calorimetry of epoxy resin samples with various levels of the zinc acrylate/dibutylamine compound.

Figure 25:
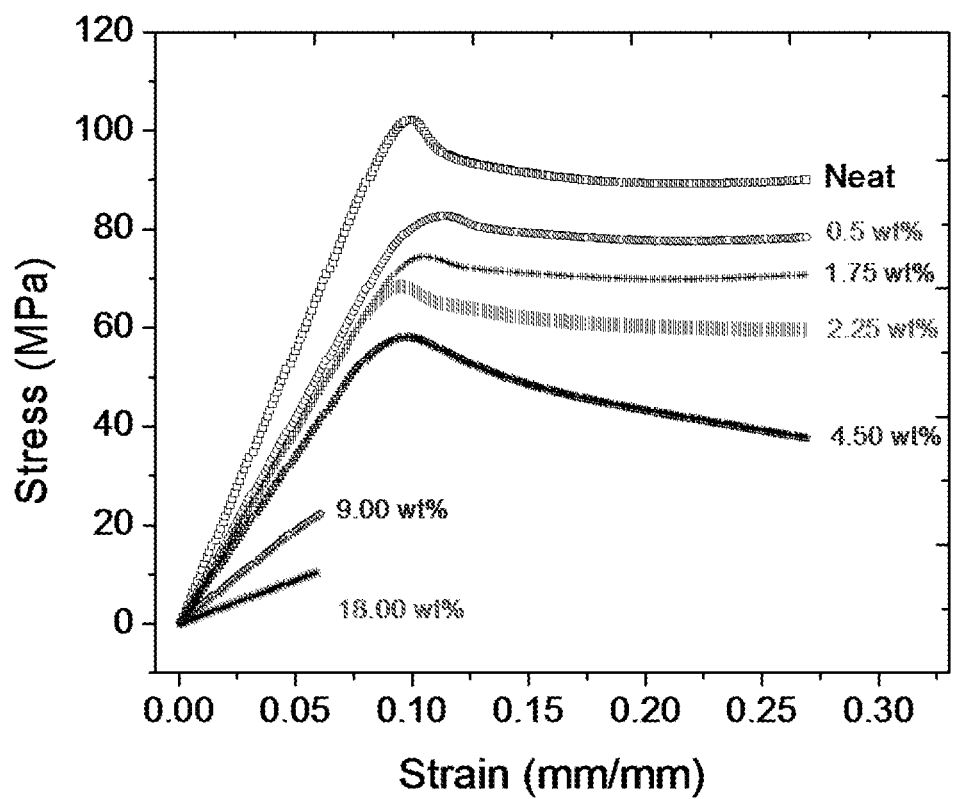

FIG. 25 shows a graphical illustration of the compressive tensile tests that show the effect of β-amino ester complex of zinc acrylate on the mechanical properties of an Epoxy (Epon™ Resin 826)+Jeffamine® D230. The concentrations reported are percentage by weight as zinc.

Figure 26:
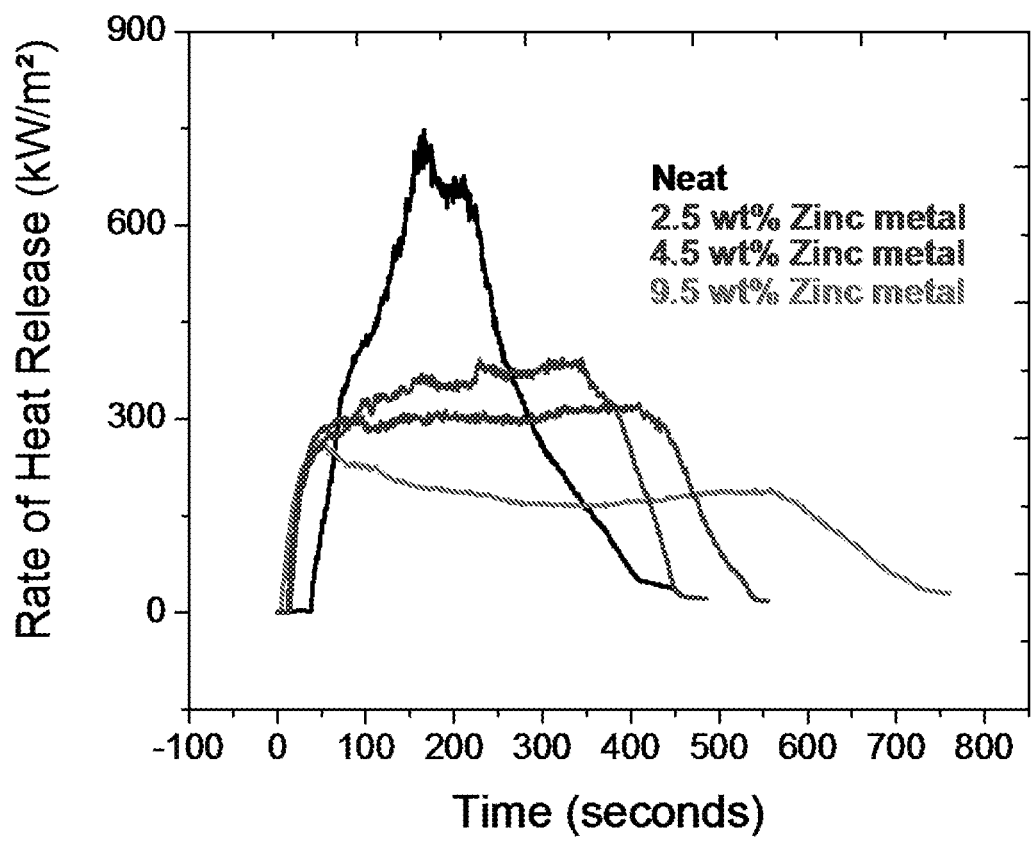

FIG. 26 shows a graphical illustration of the cone calorimeter measurements that show the effect of reaction product of diethanolamine and zinc acrylate on the flammability of a self-healing polyurethane. The concentrations of zinc acrylate/diethanolamine compound are shown as percentages as zinc.

Figure 27:
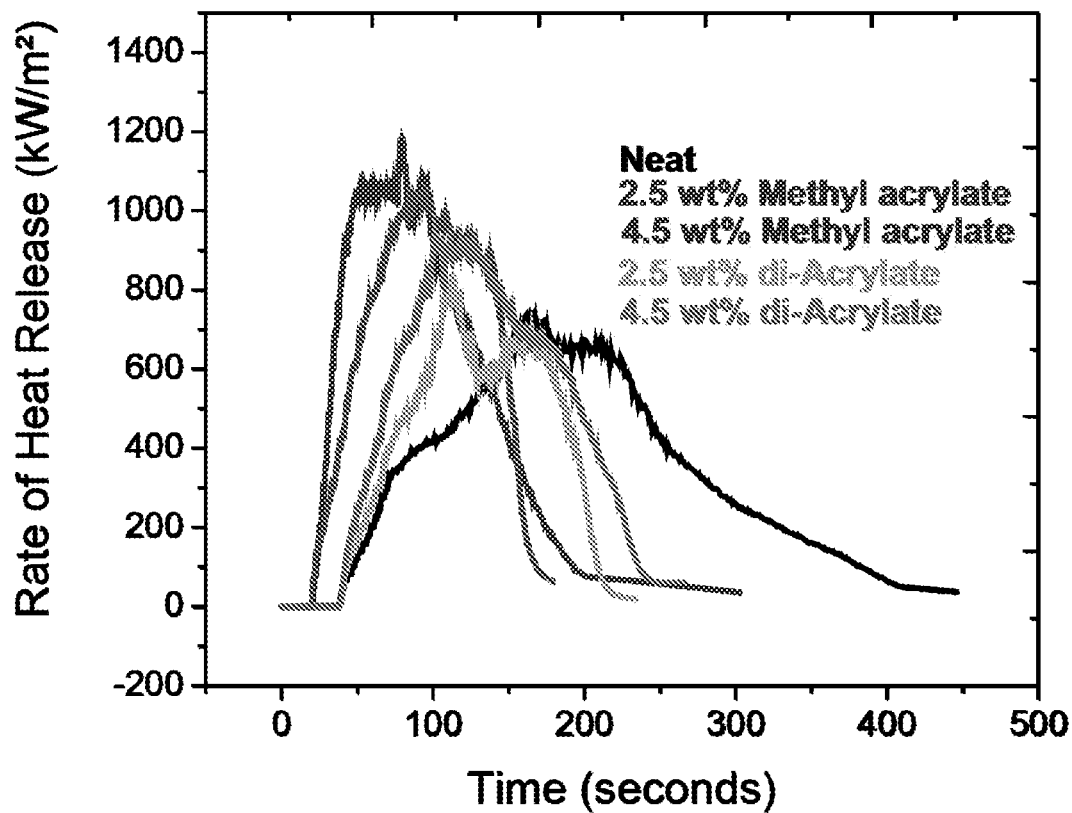

FIG. 27 shows a graphical illustration of the cone calorimeter measurements that show the effect of methyl acrylate and hexanediol diacrylate additives to polyurethane.

DETAILED DESCRIPTION OF THE INVENTION

The invention provides for novel flame-retardant compositions and methods for preparing such compositions. The flame-retardants of the invention are metal-based and soluble in flammable or combustible materials and encompass a wide range of metal compounds that can be added to a wide range of materials. The metal-based flame-retardants of the invention reduce the rate of heat, smoke, and CO and $CO_2$ release.

As used herein, the following terms are defined as follows. The term 'metal compounds' has its usual chemical meaning and includes chemical compounds and coordination complexes formed between metals and ligands. The term 'metal entities' encompasses elements, ions, compounds, and complexes of metals. The term 'metal moieties' means a chemical form of metal, such as free metal, metal salts, metal compounds, organometallic compounds, coordination complexes, and the like. The term 'polymeric materials' means materials comprising polymers. The terms 'transparent material', or 'optically transparent material', or 'substantially optically transparent material' mean a material, or article consisting of that material, which allows visible light, or an effective amount of visible light, to pass through a composition or material so that objects behind the material can be distinctly seen. The term 'transparent' is the property of transparent materials which allows visible light to pass through so that objects behind the material can be distinctly seen. The term 'soluble' means capable of being dissolved within a material. In the case of transparent polymeric materials, a compound is regarded as being soluble if a transparent product results from mixing the compound with the material. In the case of transparent polymeric materials, a compound is regarded as being dissolved if a transparent product results from mixing the compound with the material. Further, the present invention includes, and is an effective flame-retardant in the case of, partial solubility; i.e., if only a part or a portion of the compound is dissolved. A crystalline compound is regarded as being dissolved if some or all of the crystalline material's X-ray diffraction peaks are diminished or lost when the crystalline compound is mixed within another material.

The inventors of the present invention discovered that if metals, such as zinc, magnesium, nickel, cobalt, calcium compounds, or a combination thereof, are dissolved in solid solution into flammable materials, such as polymers, enhanced flame retardant performance is achieved. Current flame retardants are dispersed (usually as particulates) into polymeric materials. However, the invention provides compositions that contain dissolved rather than merely dispersed metal-based flame retardants and are superior in performance to current flame-retardants. The enhanced performance likely arises from the formation of an improved and more efficient char barrier layer formed during combustion.

Currently, preferred organohalogen and phosphorous-based flame retardants are coming under scrutiny due to health and environmental issues, some such having been banned or discontinued. Industry appears to be moving toward particulates such as magnesium hydroxide and aluminum trihydrate. However, to achieve the required flame retardant performance, these particulates have to be included at high loadings (50%-70%), which compromises the physical and mechanical properties of the material(s). The dissolved metal compounds of the present invention offer flame retardant performance at lower concentrations and provide greatly reduced rates of heat, smoke, and carbon monoxide and carbon dioxide release. The invention reduces heat, smoke, and carbon monoxide (CO) emissions rates to about one-half of the rates emitted by untreated flammable material without the flame-retardant compositions of the invention. Further, the invention reduces carbon dioxide (CO) emissions rates to about two-thirds of the rates emitted by untreated flammable material without the flame-retardant compositions of the invention. The reduction in heat release depends upon the amount of soluble metal entity dissolved within the flammable material. These emissions results substantially differentiate the present invention from all other flame retardants. The invention addresses a need for and provides novel flame retardants that enable transparent flame-retardant polymeric materials.

The invention is based on the premise that when certain metal entities are soluble in a flammable material, enhanced flame-retardant performance results. Solubility means (1) for transparent flammable materials, the material remains substantially optically transparent when it contains one or more metal entities, or (2) a metal entity is dissolved if a crystalline metal compound loses some or all of its X-ray diffraction peaks when mixed with a flammable material. For the invention, when the metal entity is soluble in the flammable material, it produces a continuous or semi-continuous metal oxide char film barrier during combustion. The resultant enhanced flame retardancy likely arises from the more continuous char film, which forms a boundary to the emission of combustion gases and to the entry of oxygen at the burning surface. The metals that are 'flame-retardant metals' and flame-retardant metal entities and that are preferably useful in the invention comprise elements and metals that are selected from the group consisting of those elements that fall within Periods 3 and 4 of the Periodic Table of the Elements, within Groups 2-12 of the Periodic Table of the Elements, or a combination thereof. References to the Periodic Table of the Elements and the various periods and groups therein are to the version released on Dec. 1, 2018 by the International Union of Pure and Applied Chemistry. Also preferably, the compositions may include from about 0.2% to about 25% by weight as metal of flame-retardant metal.

The invention provides, as described herein, a process or method of preparing or making a novel flame-retardant composition or material which comprises dissolving at least one flame-retardant metal entity that is dissolvable and/or soluble within a flammable material to form a flame-retardant material comprised of a flame-retardant composition. The at least one flame-retardant metal entity of the new composition is not required to be completely soluble with the flammable material for the composition to be effective as a flame retardant. Further the method comprises, in the case of a combination of the at least one flame-retardant metal entity with a thermoset such as an epoxy or polyurethane, for example, sufficiently curing the flame-retardant composition by any number of appropriate methods, depending on the composition, including heating, UV curing, and/or room temperature curing, for example, and/or sufficiently mixing or blending the at least one flame-retardant metal entity, in the case of a polymer such as a polystyrene or poly(ethylene oxide), for example, into and within the already polymerized polymer. The flame-retardant composition is comprised of at least one flame-retardant metal entity dissolvable and/or dissolved in solid solution into and are soluble within the flammable material. Preferably, the composition is comprised of from about 0.2 to 25% as metal by weight of the at least one flame-retardant metal entity. The method of the invention utilizes the composition of the invention whereby the flame-retardant metal entity is selected from the group of elements consisting of a metal from or within Periods 3 and 4 of the Periodic Table of the Elements, from or within Groups 2 through 12 of the Periodic Table of the Elements, or a combination thereof. Preferably, the metals are zinc, manganese, nickel, cobalt, calcium, magnesium, or a mixture or combination thereof.

The method provides a flame-retardant composition that comprises the flammable material that is at least one polymeric material, at least one thermoset polymer, at least one thermoplastic polymer, at least one water-soluble polymer, or at least one water-swellable polymer, or a combination thereof, and that produces, upon combustion, a continuous or semi-continuous metal oxide char film barrier.

Further, another embodiment of the invention provides that the composition is optically transparent or substantially optically transparent such that an effective amount of visible light is able to pass through the composition. Yet another embodiment provides that the composition is autonomously self-healing. The latter self-healing characteristic of the invention is such that the metal entities are distributed homogeneously throughout the network structure of the polymeric material or polymer by forming chemical coordination bonds between the metal entities and ligands on the polymer chains. Further, at least one amine may be optionally and selectively added to the composition to enhance or assist the dissolvability and/or solubility of the flame-retardant metal entity within the flammable material. Finally, the method of the invention provides for the formation of a metal oxide char film barrier that provides or results in a substantial reduction in the heat release rate, smoke evolution, and carbon monoxide (CO) release rates when compared to those rates released or emitted by untreated flammable material absent or without the flame-retardant composition. The method of the invention further provides for a substantial reduction in the carbon dioxide ($CO_2$) release rates when compared to those rates released or emitted by untreated flammable material absent or without the flame-retardant composition. The extent of such reductions depends on the concentration(s) of metal entity(ies).

The invention also provides for improving the flame-retardant properties of a flammable material by forming or preparing the flame-retardant composition of the invention and sufficiently curing by a number of appropriate methods depending on the composition including, for example, heating, UV curing, and room temperature curing, for the case of a combination of the at least one flame-retardant metal entity with a thermoset, for example, and/or mixing or blending of the at least one flame-retardant metal entity into and within an already polymerized polymer, for the case of a combination of the metal entity with a polymer such as a polystyrene or poly(ethylene oxide), for example. The flammable material improved can be many types of materials including polymeric, coating, building, and/or construction material, for example. Novel flame-retardants are described herein. The research that led to the present invention unexpectedly resulted in new compositions and methods for improved flame-retardant performance that can be achieved if the metal entities are soluble within flammable materials. Solubility of metal entities can be achieved by selection of metal compounds or metal complexes that are soluble within the targeted material. The soluble metal entities show improved flame retardancy even in the absence of halogenic or phosphorus compounds. For the flame-retardant compositions of the invention, the at least one flame-retardant metal entity of the new compositions may or may not be, and is not required to be, completely soluble with the flammable material for the composition to be effective as a flame retardant.

The relative flammability of materials can be evaluated using a cone calorimeter. The cone calorimeter was introduced by the National Institute of Standards and Technology in response to the need of the fire community for reliable bench-scale measurements of material flammability. The cone calorimeter has since become a standard tool to assess the flammability of materials. Today, the cone calorimeter test is widely used to examine the performance of flame-retardant polymers and it is, at present, one of the most advanced methods for assessing the fire behavior of materials. The test apparatus contains an electric heater, an ignition source, and a gas collection system. In cone calorimetry, the thermal response of a sample depends on the applied radiation intensity. The principle of cone calorimeter experiments is based on the measurement of decreasing $O_2$ concentration in the combustion gases of a sample subjected to a given heat flux. The cone calorimeter brings quantitative analysis to the flammability research of materials by investigating parameters such as heat release rate, time to ignition, total heat release, and mass loss rate during combustion. Typically, the subject material is irradiated with a heat intensity similar to that experienced in a fire situation (25-75 $kW/m^2$) and the ignition, heat release, and smoke release characteristics of the materials are measured. Generally, the heat of combustion of any organic material is directly related to the amount of oxygen required for combustion. Heat release rate measurements can be further interpreted by looking at average heat release rate, peak heat release rate, and time to peak heat release rate. Heat release rate is a key measurement that can be used to assess the fire hazard of materials and products as it quantifies fire size, rate of fire growth and, consequently, the release of associated smoke and toxic gases. The cone calorimeter, if so configured, can also measure and quantify smoke output as well as $CO/CO_2$ release rates. Cone calorimeter tests can be conducted in accordance with national and international standards including BS 476 (Part 15), ASTM 1356-90, ASTM E1354 and ASTM E1474, ISO 5660.

The inventors discovered that certain metal compounds, when soluble in clear flammable polymeric materials, yielded transparent, or optically transparent or substantially optically transparent, flame-retarded polymeric materials. Such soluble metal moieties yielded polymeric materials that exhibited measurably-improved flame-retardancy compared to the same polymeric materials in which the metal entities were dispersed as particulates. The flammable material of the composition of the present invention is or may be one or more polymeric material, one or more thermoset polymer, one or more thermoplastic polymer, one or more water-soluble polymer, or one or more water-swellable polymer, or a combination thereof. Flame retardancy was improved and smoke emission was substantially reduced when the metal compounds were soluble rather than dispersed as particulates. The present invention providing for an increase in flame-retardant performance results from the metal compounds being soluble within the matrix of a flammable material. Moreover, the combustion of the transparent compositions with soluble metal entities resulted in a metal oxide char film barrier that was a continuous film, whereas compositions in which metal entities were dispersed substantially as particulates generated a discontinuous char film. The present invention is effective and provides novel flame-retardant compositions even if only a part or a portion of the metal entity(ies) is soluble within the flammable material. The improved flame-retardancy from the compositions and methods of the invention results from the formation of a more continuous metal oxide char film barrier formed during combustion of the soluble metal entities.

The inventors discovered that continuous film chars are formed when metal compounds are soluble in the flammable material. Further, when the flammable material is clear, optical transparency of the metal-containing flammable materials is an indication of solubility of metal moieties within the clear flammable material.

In some embodiments, improved flame-retardants were achieved by combining a metal compound with at least one appropriate amine, which was then mixed within the flammable material to form a solution or resin. The following examples further illustrate various aspects of the invention and are not intended to limit the scope of the invention.

Example 1. Metal-Amine Compound Synthesis

In one embodiment, an effective stoichiometric amount of a primary amine was introduced optionally to assist the solubility of various metal salts, such as zinc acetate, zinc acrylate, zinc citrate, zinc undecylenate, zinc stearate, nickel acetate, cobalt acetate, and manganese acetate into target flammable polymeric materials. Solubility of the flame-retardant could be signified by the formation of a transparent material containing the dispersed metal complex within the flammable material. Solubility of the flame-retardant can also be signified by X-ray diffraction patterns that show the complete loss of metal-salt crystal structure when the metal entity is mixed with the flammable material. Partial solubility can be shown by translucency of the mixture of metal entity and flammable material. Partial solubility can also be detected by partial loss of X-Ray diffraction pattern. For opaque flammable materials, comparison of Hansen solubility parameters can be used to select metal entities with solubility in the flammable material.

In this embodiment, an amine is heated sufficiently to cure and to cause reaction between the metal compound and the amine. Other curing methods can be employed as well. For example, Jeffamine® D230 heated to 65° C., followed by slow addition of the metal compound zinc acrylate, undergoes Michael addition to form a metal-amine compound that can be soluble in epoxy resin without agglomeration or phase separation.

Figure 1:
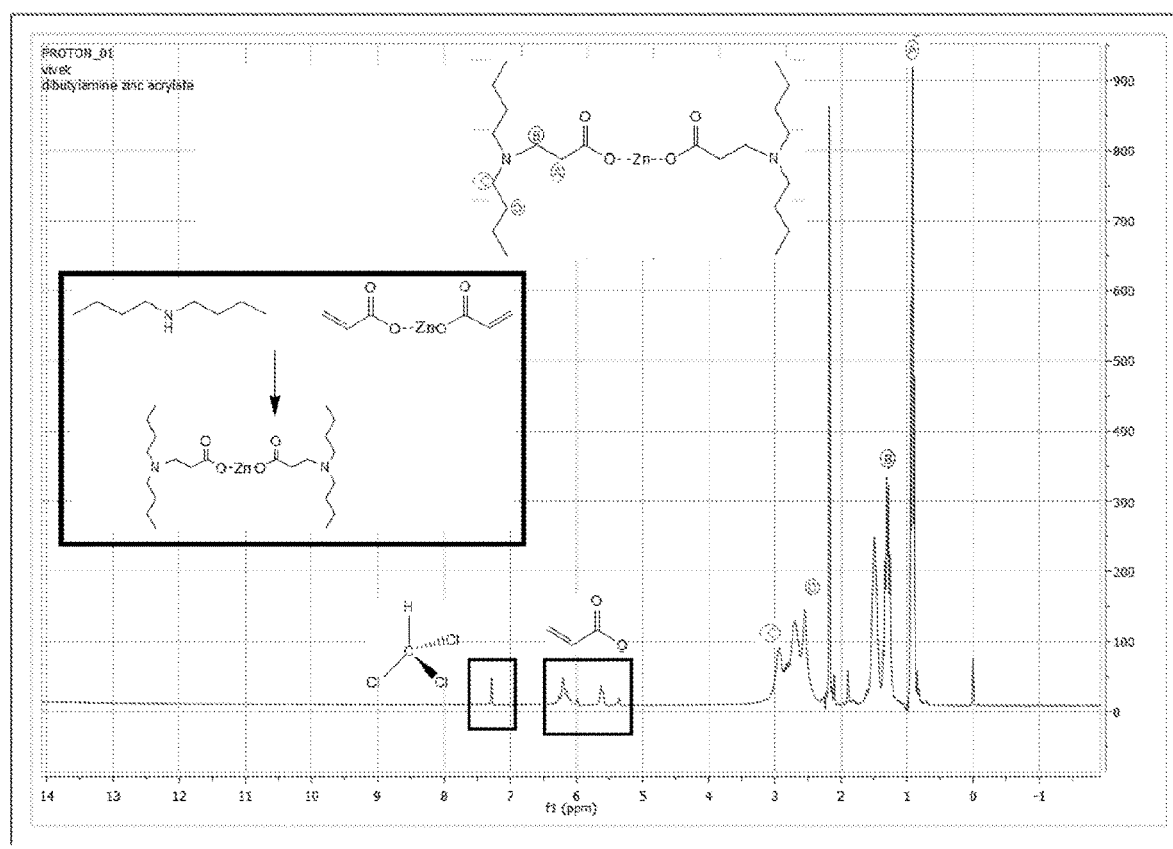
FIG. 1 shows a graphical illustration of the proton NMR spectrum of the reaction product of zinc acrylate with stoichiometric quantities of dibutylamine.

In the case of zinc acrylate, reaction between dibutylamine and acrylate was confirmed as a Michael addition reaction by proton NMR performed on solution of the prepared compound in deuterated acetone. The NMR spectrum revealed the diminution of acrylate peaks indicating that the proton from the amine groups has been utilized to react with the acrylate component in the zinc acrylate. FIG. 1 shows a graphical illustration of the proton NMR spectrum of the reaction product of zinc acrylate with stoichiometric quantities of dibutylamine. When the dibutylamine and zinc acrylate mixing ratio was in the vicinity of a stoichiometric match, clear materials resulted, whereas stoichiometric mismatch of the amine and the zinc resulted in cloudy materials. (Table 1).

TABLE 1

The effects of stoichiometry on zinc acrylate-dibutylamine compositions

| Mole Ratio of Zn Acrylate:Dibutylamine | Appearance |
| --- | --- |
| 0.5:1 | Completely soluble, Transparent |
| 0.75:1 | Hazy/translucent |
| 1:1 | Opaque/immiscible |
| 2:1 | Phase-separated mixture. |

In this embodiment, suitable soluble metal-amine compounds were synthesized from primary and secondary amines, whereas no reaction was detected in mixtures of metal moieties with tertiary amines. This result provides support to the premise that an active proton on the amine group reacts with the acrylate and that the metal-amine compounds were formed by Michael addition.

Figure 2:
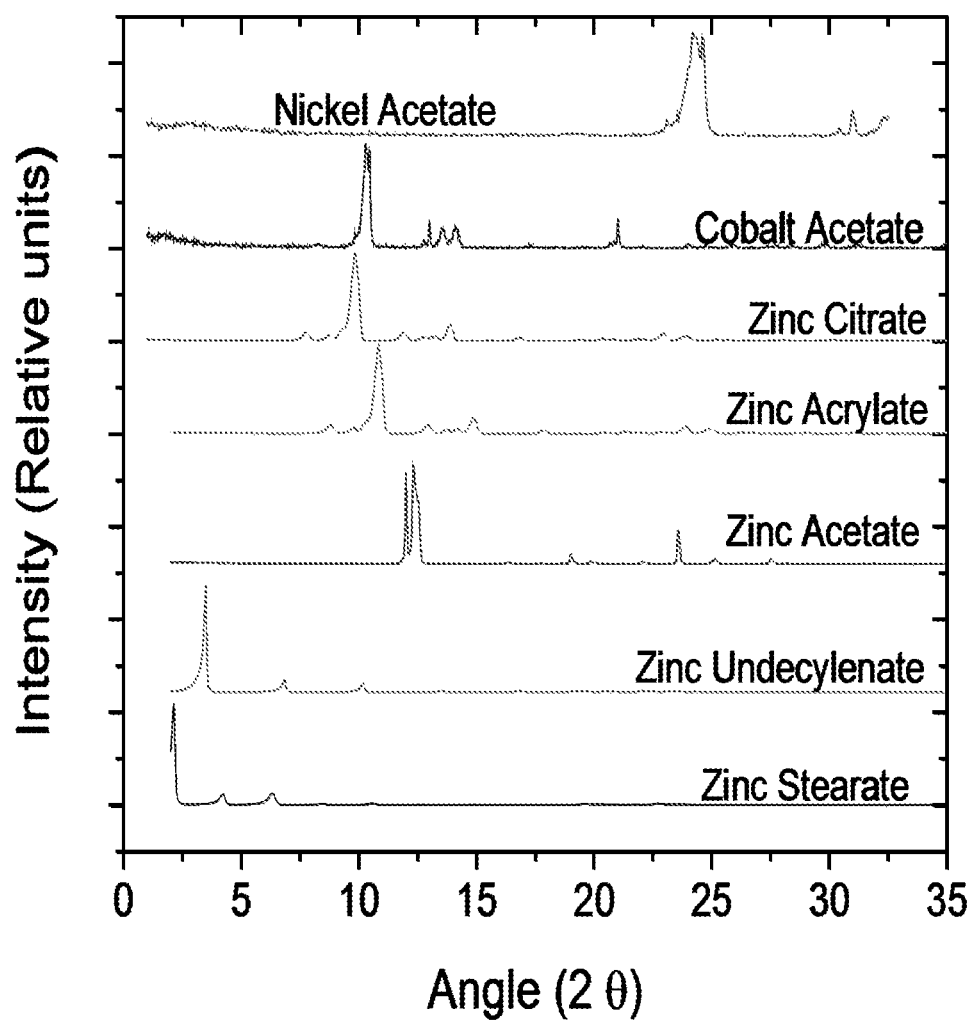
FIG. 2 shows a graphical illustration of the diffractograms of salts that were included in the investigations that led to the present invention.
Figure 3:
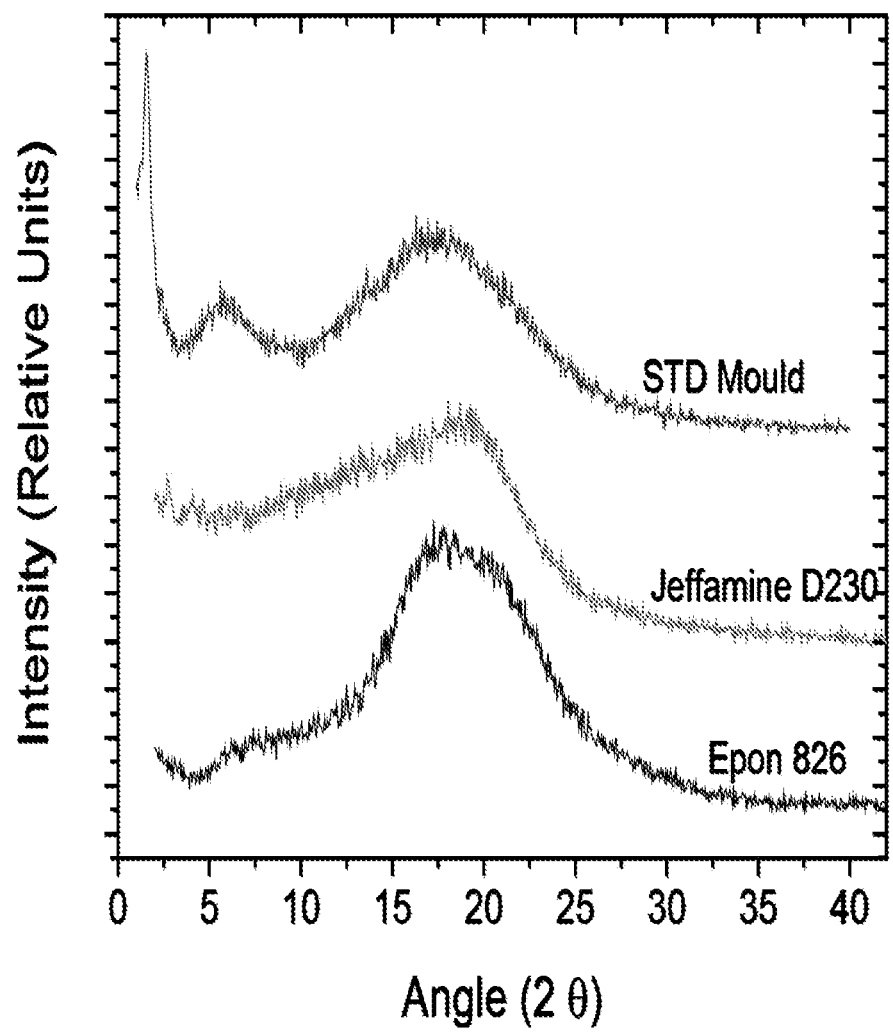
FIG. 3 shows a graphical illustration of the diffractograms of epoxy resin synthesized from Epon 826 and Jeffamine D230 and its constituent components.
Figure 4:
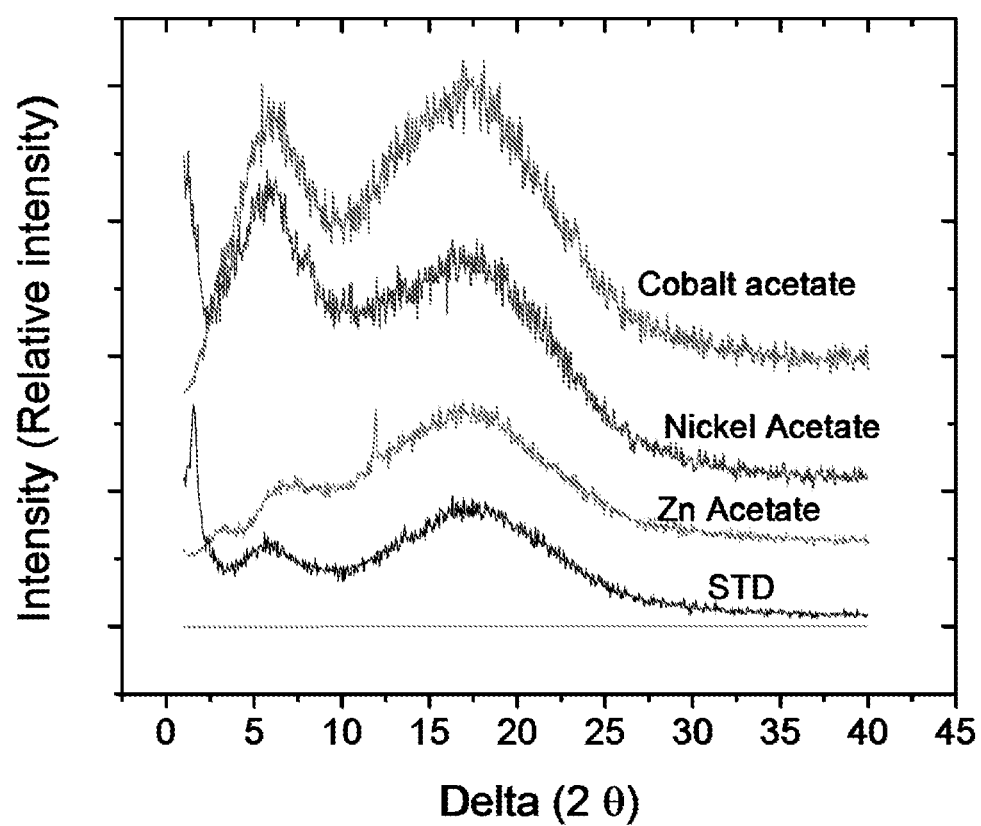
FIG. 4 shows a graphical illustration of the diffractograms of epoxy resin samples that contained metal salts. The epoxy resin was synthesized from Epon 826 and Jeffamine D230. The sample denoted STD is the virgin epoxy resin.
Figure 5:
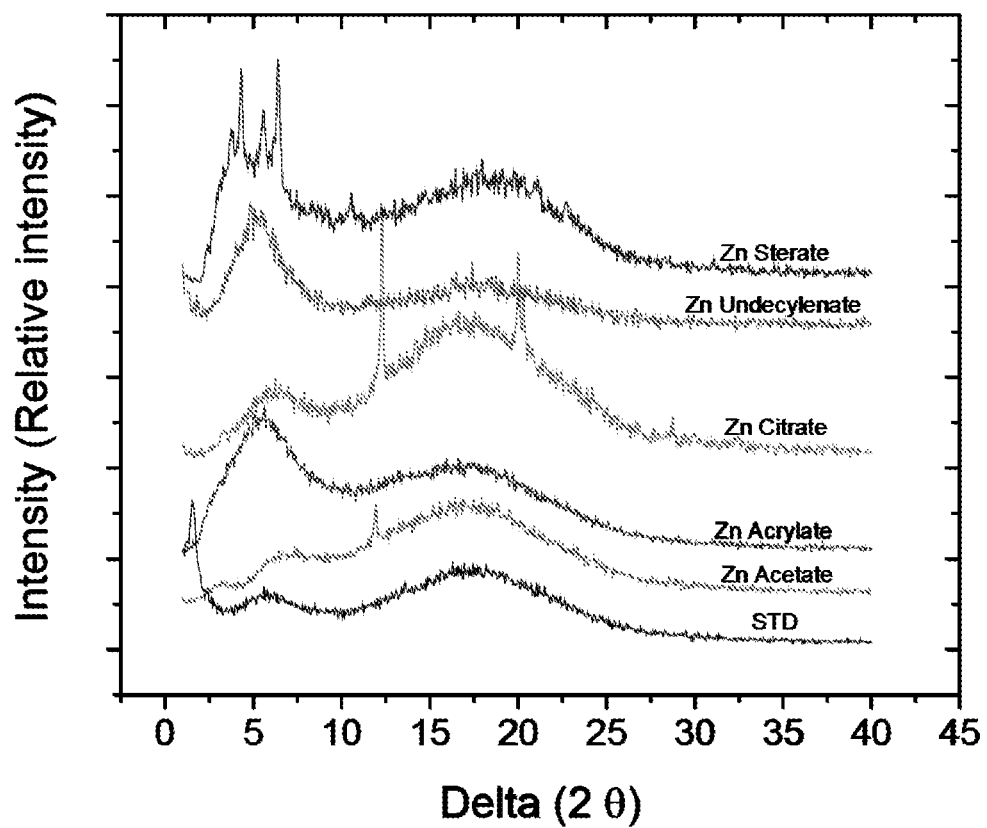
FIG. 5 shows a graphical illustration of the diffractograms of epoxy resin samples that contained zinc salts. The epoxy resin was synthesized from Epon 826 and Jeffamine D230. The sample denoted STD is the virgin epoxy resin.

X-ray diffraction reveals the loss of crystal structure of salts that are soluble within polymeric matrices. FIG. 2 shows a graphical illustration of the diffractograms of zinc, cobalt, and nickel acetates and various other zinc salts that were included in the investigations that led to the present invention. X-ray diffraction of the salts was characterized by sharp diffraction peaks at specific angles that were indicative of crystal lattice spacing. X-ray diffractograms of the epoxy resins and its constitutive components are shown in FIG. 3 FIG. 3 shows a graphical illustration of the diffractograms of epoxy resin synthesized from Epon 826 and Jeffamine D230 and its constituent components. The epoxy resins and its reactants show only broad diffraction peaks. Solubility of metal compounds in epoxy resin is indicated by loss of sharp X-Ray diffraction peaks. FIG. 4 shows a graphical illustration of the diffractograms of epoxy resin samples that contained metal salts. The epoxy resin was synthesized from Epon 826 and Jeffamine D230. The sample denoted STD is the virgin epoxy resin. FIG. 5 shows a graphical illustration of the diffractograms of epoxy resin samples that contained zinc salts. The epoxy resin was synthesized from Epon 826 and Jeffamine D230. The sample denoted STD is the virgin epoxy resin. As shown in FIGS. 4 and 5, the crystal diffraction peaks disappeared when the following salts were included in the epoxy resin: nickel acetate, cobalt acetate, zinc acrylate, and zinc undecylate. In these instances, the diffraction pattern was characterized by the broad diffraction peaks of the epoxy resin. A single diminished crystal diffraction peak is seen in epoxy resin containing zinc acetate. Diffraction peaks persist for epoxy resins that contain zinc citrate and zinc stearate. However, preparation at elevated temperatures yielded transparent epoxy resins that contained zinc stearate or magnesium stearate. These transparent epoxy resins showed no diffraction peaks for the crystalline stearates and showed only broad diffraction patterns that are characteristic of the epoxy resin.

In some embodiments, flammable materials of interest included epoxy resins, polyurethane, polystyrene, or poly(ethylene) oxide. Subject to conserving solubility, the choice of the amine can be selected to limit the size of the organic component in order to minimize possible flammability potential. As a preliminary test for suitability, the solubility of metal-amine compounds or complexes in various solvents can be determined. Using the basic concepts of solubility parameter theory, the metal-amine compounds or complexes can be selected to be soluble in targeted flammable materials. In this test, the prepared small molecule additive could be tested for its miscibility with various solvents. For example, small quantities of a compound formed from N,N'-di-n-butylamine and zinc acrylate were added to a range of solvents for the target polymer. After a short time, the contents of each vial were inspected for solubility of the flame-retardant or the lack thereof. The results are summarized in Table 2. In this way, the solubility profile of a given compound was determined. The solubilities of flammable materials were determined by the same procedure. Comparison of the solubility profiles of the metal-amine compounds and the flammable materials, respectively, allowed selection of metal-amine compounds with solubility in a flammable material.

TABLE 2

Solubility of Zinc acrylate-N,N di-n-butylamine compound with various solvents

| Solvent | Solubility |
| --- | --- |
| Acetone | Soluble |
| Water | Immiscible |
| Methylene Chloride | Soluble |
| THF | Soluble |
| Ethanol | Partially Soluble. but hazy |
| Xylene | Soluble |

This approach narrows the choice of metal entities to those that correspond to the solubility parameter of the flammable material. For example, ethylenediamine is a primary amine which is water-soluble. Ethylenediamine was selected as a candidate to prepare a compound to disperse the metal moiety in water-soluble materials such as polyethylene oxide. Following the identification of appropriate solvents, a prepared metal entity can be homogeneously mixed with a flammable material by dissolving both flammable material and metal entity in a common solvent. Removal of solvent allows the resulting flame-retardant flammable material to be cast in a desired shape for testing. Thus, solubility parameter comparison allows selection of the appropriate amine for conferring solubility of the metal entity into the flammable materials during compounding or mixing operations.

In a preferred embodiment, epoxy-amine resins contain flame-retardant metal compounds that are soluble in an epoxy resin.

Epoxy-Amine Systems

Figure 6:
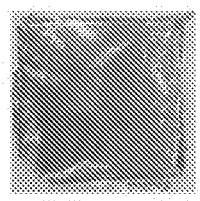
FIG. 6 shows a pictorial representation of samples of epoxy resin containing zinc oxide or zinc borate before and after burning in the cone calorimeter. Samples are shown at the top of the figure and the corresponding char is shown beneath each sample.
Figure 6:
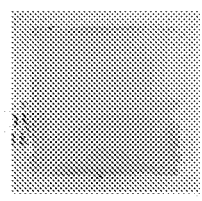
Figure 6:
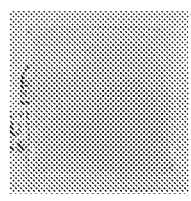
Figure 6:
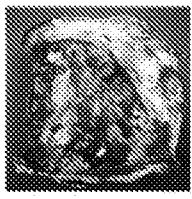
Figure 6:
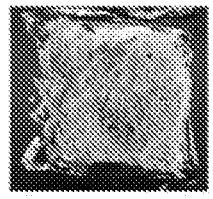
Figure 6:
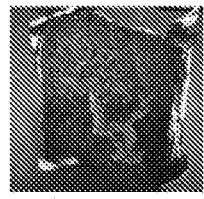
Figure 7:
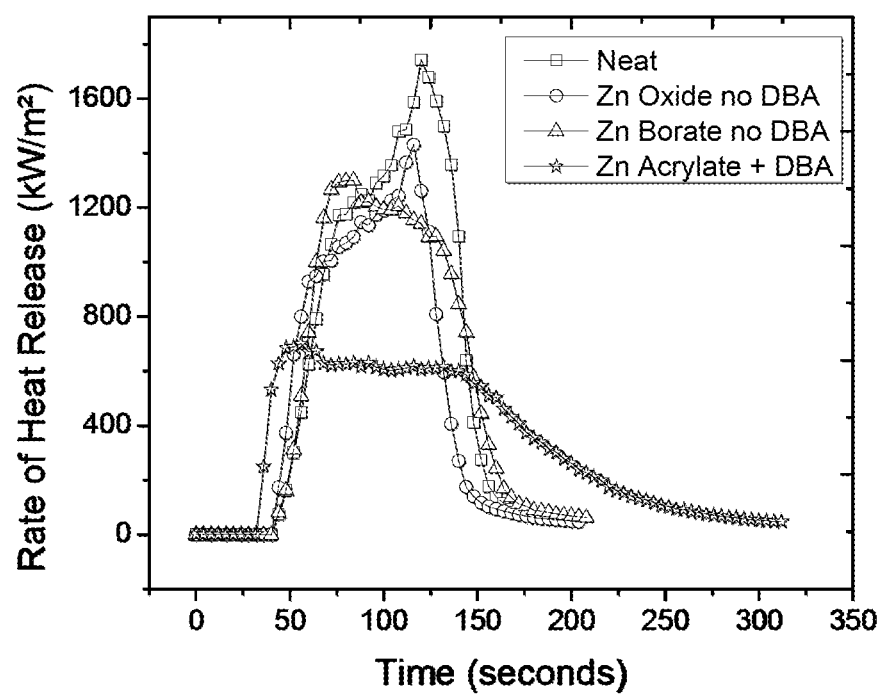
FIG. 7 shows a graphical illustration of cone calorimeter measurements of the effect of zinc oxide and zinc borate (Firebrand ZB Fine supplied by Borax (20 mule team)) on the flammability of epoxy resin prepared from Epoxy (Epon™ Resin 826)+Jeffamine® D230).

Thermoset epoxy composites were prepared utilizing Epon 826 (epoxy resin), which was procured from Hexion Inc., and Jeffamine D230 (primary amine), which was procured from Huntsman Corporation. The epoxy resin was transparent and upon the addition of zinc oxide or zinc borate flame-retardants, the epoxy resins became opaque, indicating that these oxides were essentially insoluble in the polymer. (FIG. 6). FIG. 6 shows a pictorial representation of samples of epoxy resin containing zinc oxide or zinc borate before and after burning in the cone calorimeter. Samples are shown at the top of the figure and the corresponding char is shown beneath each sample. The epoxy resin was prepared from Epon™ Resin 826 and Jeffamine® D230. Each sample contained 2.25% zinc. The epoxy resin sample containing no zinc compounds was transparent and produced no char upon burning. The epoxy resin films containing zinc oxide or zinc borate produced opaque samples that yielded discontinuous chars upon burning. When incorporated at a concentration of about 2.25 weight percent zinc, samples containing zinc oxide or zinc borate (Firebrand® ZB Fine supplied by Borax) showed a small reduction in the peak heat release rate upon burning in the cone calorimeter. (FIG. 7). FIG. 7 shows a graphical illustration of cone calorimeter measurements of the effect of zinc oxide and zinc borate (Firebrand ZB Fine supplied by Borax (20 mule team)) on the flammability of epoxy resin prepared from Epoxy (Epon™ Resin 826)+Jeffamine® D230). The zinc oxide and zinc borate compounds contained no dibutylamine and the samples were opaque. The sample denoted 'Neat' is epoxy resin with no zinc additive. The sample denoted 'Zn Acrylate+DBA' contains a compound prepared by Michael addition of N,N-di-n-butylamine to zinc acrylate. This sample is transparent. All samples contained 2.25% Zinc. The compound formed from zinc acrylate and N,N'-di-n-butylamine was soluble in the epoxy amine resin and the reduction in peak heat release rate was considerable for the epoxy resin having the soluble zinc compound included.

Step 1: Metal-Amine Compound Synthesis

Metal-amine compounds were prepared by mixing organometal salts (zinc acrylate, zinc acetate, zinc undecylenate, zinc stearate, zinc citrate, nickel acetate), with dibutylamine according to the following method. Dibutylamine was added to a container and heated to 70° C. Stoichiometric amounts of organometal salt powder were added slowly to attain a molar ratio of 2:1 for dibutylamine:zinc. A small amount of acetone, or other such nonreactive solvent, alternatively could be added to ease the mixing process. The prepared mixture was visually evaluated for its transparency and later the acetone solvent was removed by evaporation and each sample was visually evaluated for transparency.

Step 2: Example Composition Fabrication for Organometal Zinc Salts-Butylamine

Figure 8:
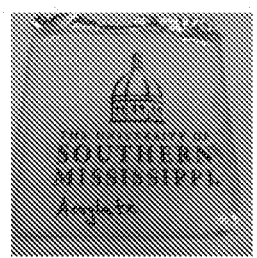
FIG. 8 shows a pictorial representation of the films of epoxy resin containing zinc salts with N,N-di-n-butylamine. The epoxy resin was prepared from Epon™ Resin 826 and Jeffamine® D230. All of the zinc compounds were prepared using N,N-di-n-dibutylamine as the amine raw material.
Figure 8:
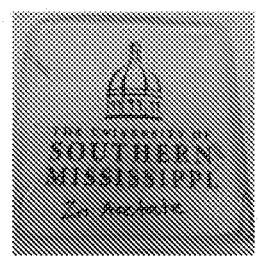
Figure 8:
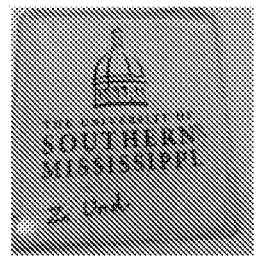
Figure 8:
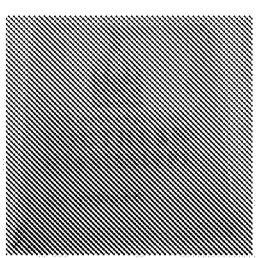
Figure 8:
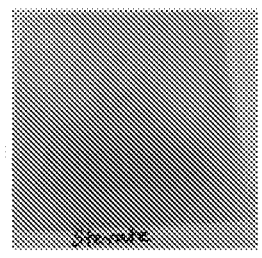
Figure 8:
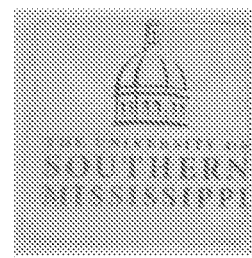
Figure 9:
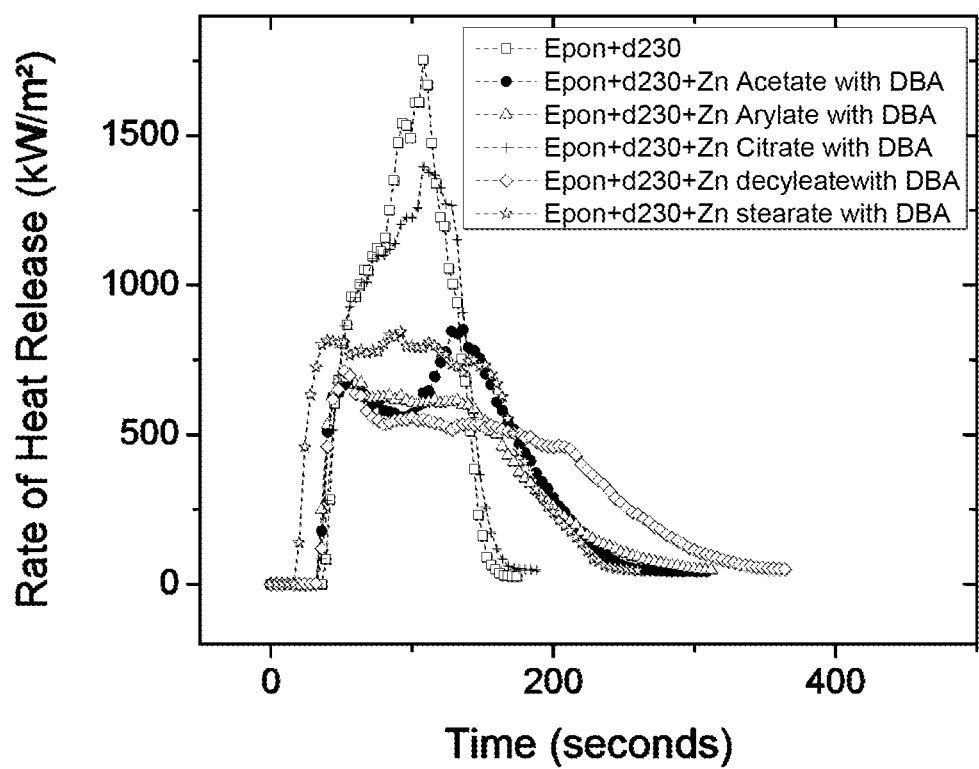
FIG. 9 shows a graphical illustration of the cone calorimeter measurements of the effect of zinc salts with N,N-di-n-butylamine on the flammability of epoxy resin prepared from Epoxy (Epon™ Resin 826)+Jeffamine® D230.

Thermoset compositions, such as epoxy-amine systems, were prepared by preheating the epoxy (Epon) to 75° C. for 1 hour under stirring. Calculated quantities of organometal zinc salt-dibutylamine compound were mixed with a common solvent, acetone, and added slowly to the preheated epoxy, and stirring was continued for an additional hour. Then the temperature of each composition was reduced to 45° C. and a stoichiometric quantity of an appropriate amine monomer was added to the resin mixture. Following this, the mixture was then degassed and cast in a mold. The curing schedule followed was 90° C. for 12 hours. Samples were cast into molds and assessed for clarity. Examples of such cast samples are shown in FIG. 8. FIG. 9 shows a graphical illustration of the cone calorimeter measurements of the effect of zinc salts with N,N-di-n-butylamine on the flammability of epoxy resin prepared from Epoxy (Epon™ Resin 826)+Jeffamine® D230. Each epoxy resin sample contained 2.25% zinc. The sample denoted Epon+d230 is epoxy resin with no zinc additive.

Step 3: Evaluation of Flame-Retardant Performance

The cone calorimetry test results, shown in FIG. 7, revealed that the peak heat release rate of the epoxy-amine composition containing the zinc acrylate/N, N-di-n-butylamine compound was significantly lower than the peak heat release rate of the neat epoxy resin and was also much lower than the samples that contained dispersed particles of zinc oxide or zinc borate. This lower peak heat release rate was attributed to the presence of soluble zinc compound in the epoxy resin.

Figure 10:
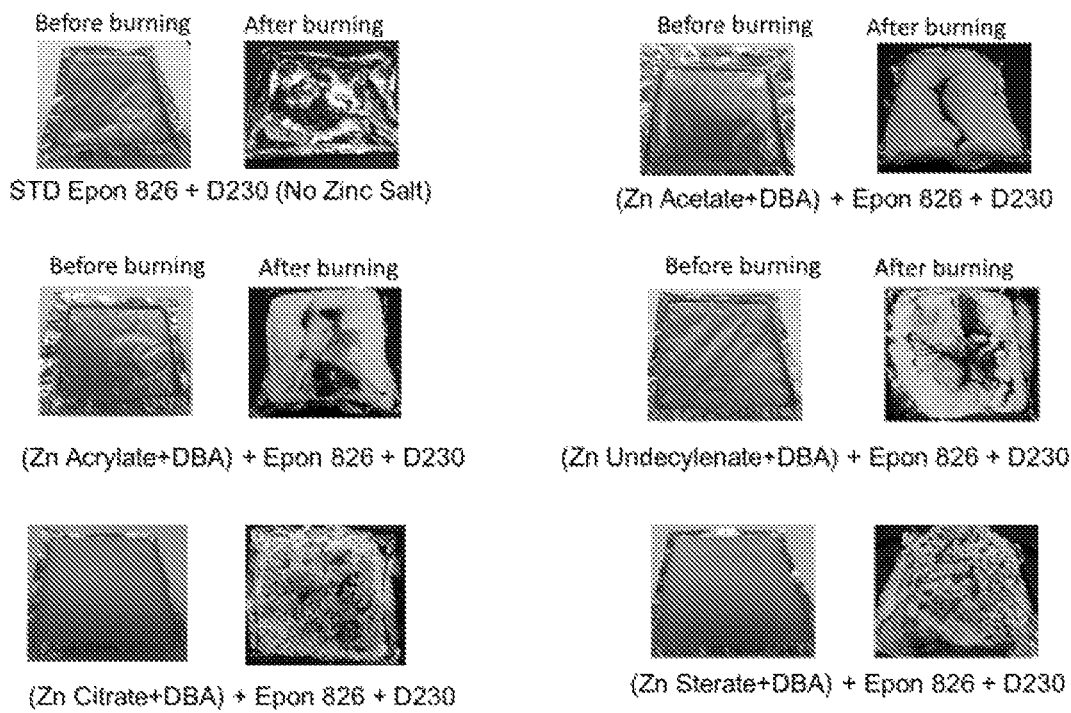
FIG. 10 shows a pictorial representation of samples of epoxy resin containing zinc salts with N,N-di-n-butylamine before and after burning in the cone calorimeter. The epoxy resin was prepared from Epon™ Resin 826 and Jeffamine® D230. All of the zinc compounds were prepared using dibutylamine as the amine raw material.

Compositions with flame-retardant additives prepared using other salts were also synthesized using the above method and the flame retardancy performance was evaluated using a cone calorimeter. For this purpose, zinc acetate, zinc stearate, zinc citrate, zinc undecylenate, cobalt acetate, and nickel acetate were used to compare the effect of solubility on the flame-retardant properties. Transparent epoxy-amine compositions were achieved with N,N-di-n-butylamine products formed from zinc acetate, zinc acrylate, and zinc undecylenate, whereas the composition formed with zinc citrate produced an epoxy-amine material that was opaque or translucent. Opacity or pronounced translucency was taken to indicate the presence of particulates. (FIG. 10). FIG. 10 shows a pictorial representation of the films of epoxy resin containing zinc salts with N,N-di-n-butylamine. The epoxy resin was prepared from Epon™ Resin 826 and Jeffamine® D230. All of the zinc compounds were prepared using N,N-di-n-dibutylamine as the amine raw material. Each epoxy resin sample contained 2.25% zinc. Epoxy resin films containing zinc acrylate, zinc acetate, zinc undecylenate are transparent. Epoxy resin films containing zinc citrate are translucent or opaque. Cone calorimetry results for the zinc-amine compounds are shown in FIG. 9, and the effects of adding the products of various zinc salts and dibutylamine to epoxy-amine compositions are summarized in Table 3. FIG. 10 shows a pictorial representation of samples of epoxy resin containing zinc salts with N,N-di-n-butylamine before and after burning in the cone calorimeter. The epoxy resin was prepared from Epon™ Resin 826 and Jeffamine® D230. All of the zinc compounds were prepared using dibutylamine as the amine raw material. Each epoxy resin sample contained 2.25% zinc. Epoxy resin films containing zinc acrylate, zinc acetate, zinc undecylate are transparent and they all produce continuous film chars upon burning. Epoxy resin films containing the zinc citrate are translucent or opaque and they produce discontinuous chars upon burning. Epoxy resin films containing zinc stearate are translucent or opaque and they produce chars that are discontinuous on top and continuous films underneath.

TABLE 3

The effects of adding the product of dibutylamine with various zinc salts to epoxy-amine compositions

| Sample identity | Epon + d230 (neat) | Epon + d230 + ZnAcrylate Mould | Epon + d230 + ZnAcetate Mould | Epon + d230 + ZnCitrate Mould | Epon + d230 + Undecylena Mould | Epon + d230 + ZnStearateMould |
|---|---|---|---|---|---|---|
| Tig (s) | 45.00 | 36.2 | 36.57 | 38.4 | 36.41 | 21.5 |
| PHRR(KW/m2) | 1754.20 | 703.4 | 866.60 | 1437.0 | 712.30 | 848.4 |
| tPHRR(s) | 108.00 | 54.0 | 132.50 | 113.0 | 52.00 | 90.0 |
| THR (MJ/m2) | 85.2 | 91.7 | 90.5 | 98.2 | 91.8 | 97.5 |
| Physical state | Transparent | Transparent | Transparent | Opaque | Transparent | Opaque |

N,N-di-n-butylamine products formed from zinc acrylate, zinc acetate, and zinc undecylenate were soluble in the epoxy-amine compositions to form optically-transparent compositions. Metal salt X-ray diffraction peaks were absent from the X-ray diffractograms of those epoxy-amine compositions. The peak heat release rate of the epoxy-amine compositions comprising zinc acrylate, zinc acetate, and zinc undecylenate was significantly lowered when compared to the peak heat release rate of the neat epoxy-amine composition. The N,N-di-n-butylamine products formed from zinc citrate dispersed to produce an opaque dispersion and the peak heat release rate was lowered marginally. Epoxy-amine complexes containing the N,N-di-n-butylamine products formed from zinc stearate resulted in opaque compositions with significantly lowered peak heat release rates. If the entire zinc stearate sample was prepared at 90° C., the samples containing the product of zinc stearate and butylamine became transparent. The zinc stearate opaque dispersion is likely due to crystallization of the stearate chain. This explains why transparent samples could be generated by preparing epoxy amine containing the N,N-di-n-butylamine-zinc stearate products formed at temperatures which were above the melting point of the stearate chains. The clarity of the epoxy-amine resin films can be demonstrated by placing the film over a printed document and assessing the clarity of the image viewed through the film. Films placed over printed type are shown in FIG. 8. Solubility of the flame-retardant, as assessed by transparency, correlates with substantial decreases in the peak heat release rate when the polymer composition is burned, whereas opaque dispersions resulted in polymer compositions with only slightly reduced peak heat release rates. In the case of the zinc stearate samples, the zinc stearate and zinc stearate/amine compositions became soluble in the resin as the temperature rose during combustion, thus the pronounced lowering of the peak heat release rate for epoxy resin samples with incorporated zinc stearate and magnesium stearate.

Figure 11:
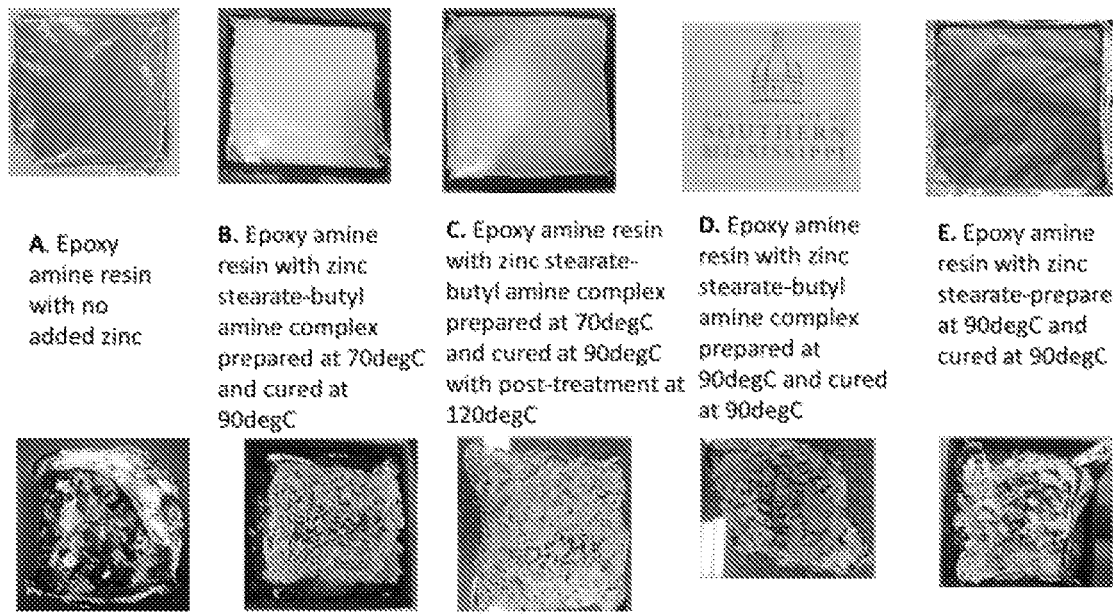
FIG. 11 shows a pictorial representation of samples of epoxy resin containing N,N-di-n-butylamine products formed by reaction with zinc salts before and after burning in the cone calorimeter. Samples prior to burning are shown in the top line and chars after burning are shown in the bottom line. The epoxy resin was prepared from Epon™ Resin 826 and Jeffamine® D230. The compound with zinc stearate was prepared using dibutylamine as the amine raw material. Sample E contained zinc stearate and did not contain N,N-di-n-butylamine.

FIG. 11 shows a pictorial representation of samples of epoxy resin containing N,N-di-n-butylamine products formed by reaction with zinc stearate before and after burning in the cone calorimeter. Samples prior to burning are shown in the top line and chars after burning are shown in the bottom line. The epoxy resin was prepared from Epon™ Resin 826 and Jeffamine® D230. Sample E contained zinc stearate with no dibutylamine. Epoxy resin with no added zinc moiety produced no char. Each epoxy resin sample contained 2.25% zinc. Epoxy resin samples containing the compound of zinc stearate are translucent or opaque when prepared at temperatures at or below 70° C. but are transparent when prepared at 90° C., and epoxy resin samples containing only zinc stearate are translucent or opaque when prepared at temperatures at or below 70° C. but are transparent when prepared at 90° C. All of the samples that contained zinc stearate produced chars that are discontinuous on top with continuous films underneath.

Figure 12:
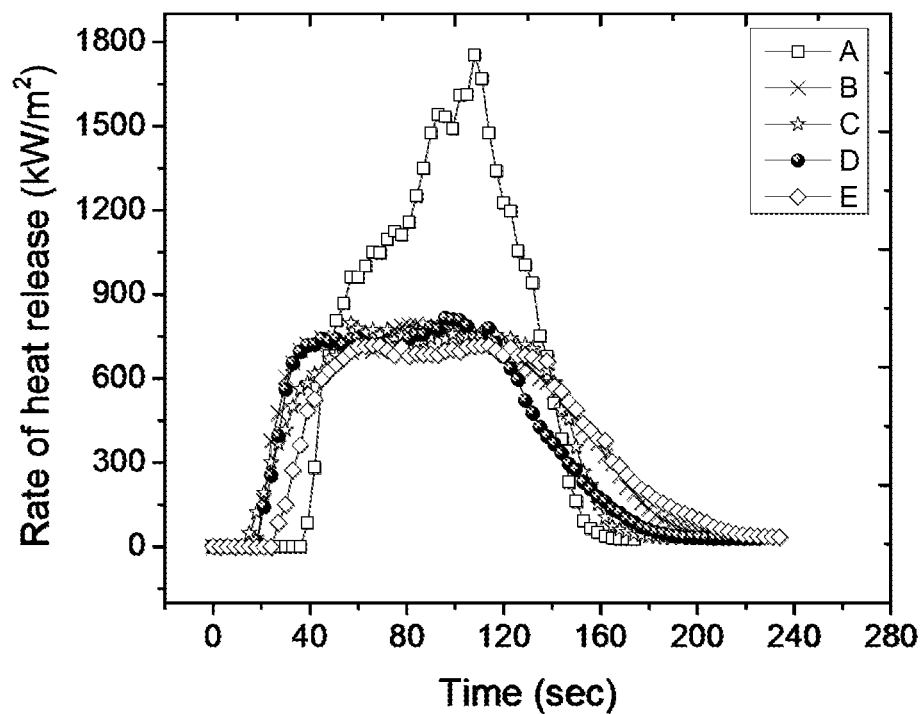
FIG. 12 shows a graphical illustration of the cone calorimeter measurements of the effect of zinc stearate and N,N-di-n-butylamine products formed by reaction with zinc stearate on the flammability of epoxy resin prepared from Epoxy (Epon™ Resin 826). Sample E contained zinc stearate and did not contain N,N-di-n-butylamine.

FIG. 12 shows a graphical illustration of the cone calorimeter measurements of the effect of zinc stearate and N,N-di-n-butylamine products formed by reaction with zinc stearate on the flammability of epoxy resin prepared from Epoxy (Epon™ Resin 826). Each epoxy resin sample contained 2.25% zinc. Samples A, B, C, D, and E are the samples of the same denomination shown in FIG. 11 and Table 4.

Figure 13:
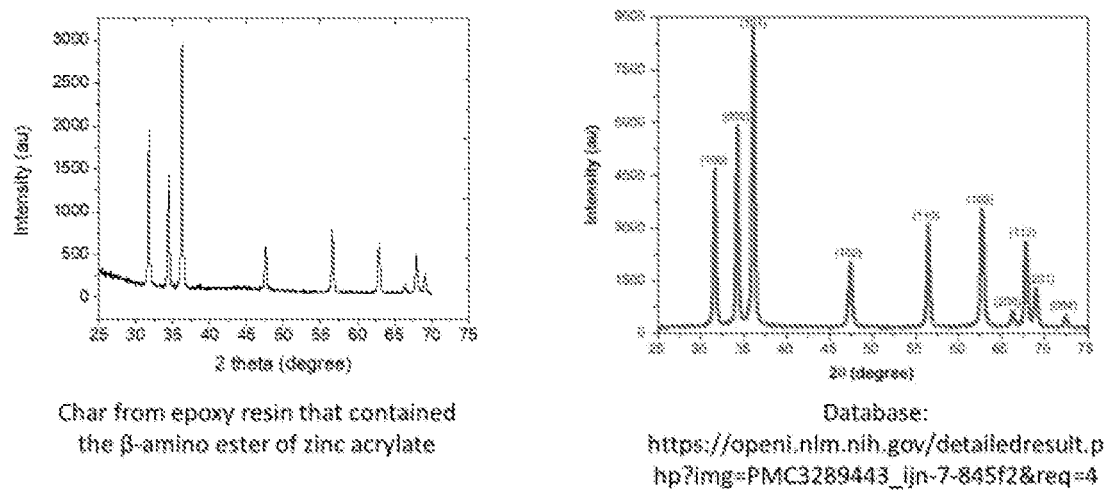
FIG. 13 shows a graphical illustration of the x-ray diffraction pattern of char that remained after cone-calorimeter burn compared to a standard X-ray diffraction pattern for zinc oxide.

FIG. 13 shows a graphical illustration of the x-ray diffraction pattern of char that remained after cone-calorimeter burn compared to a standard ray diffraction pattern for zinc oxide. Comparison with the standard X-Ray diffraction pattern of zinc oxide reveals that the char consists essentially of zinc oxide. The effect of various metal stearates on peak heat release rates, shown in FIG. 14, exemplifies the concept that solubility of metal compounds in flammable materials (FIG. 15) enhances the reduction of peak heat release rate during combustion.

The importance of solubility of the metal entity in the flammable material is demonstrated by the fact that the peak heat release rate is significantly reduced by zinc stearate alone, with no added dibutylamine, when the zinc stearate is soluble in an epoxy-amine sample. (FIGS. 11 and 12, and Table 4).

TABLE 4

The effects of formulation temperature conditions on epoxy-amine compositions with zinc stearate and compositions prepared from zinc stearate and butylamine

| Sample identity | Epon + d230 (neat) (A) | Epon + d230 + DBA + 70° C. prep cured @ 90° C. (B) | Epon + d230 + DBA + 70° C. prep cured @ 90° C. post treatment @ 120° C. (C) | Epon + d230 + DBA + 90° C. prep cured @ 90° C. (D) | Epon + d230 + Zn stearate alone 90° C. prep cured @ 90° C. (E) |
|---|---|---|---|---|---|
| Tig (s) | 45.00 | 13.5 | 17 | 18 | 24.5 |
| PHRR(KW/m2) | 1754.20 | 797.14 | 805.7 | 815.7 | 728.8 |
| tPHRR(s) | 108.00 | 57.0 | 85 | 96 | 74.5 |
| THR (MJ/m2) | 85.2 | 96.6 | 97.1 | 92.1 | 88.25 |
| Physical state | Transparent | Opaque | Small crystalline granules | Transparent | Transparent |

After burning in the cone calorimeter, the epoxy-amine compositions comprising N, N-di-n-butylamine with zinc acrylate, zinc acetate, zinc undecylenate, or zinc stearate yielded a continuous char film, whereas the char yielded by the compound prepared with zinc citrate did not appear to be a continuous film. Photographs of the char residues that remained after the cone calorimeter burns are shown in FIGS. 6 and 10. Epoxy resin with the compositions of dibutylamine with zinc stearate yielded a char that was discontinuous on top with a continuous film char beneath. (FIGS. 10 and 11). X-ray diffraction conducted on the chars revealed that these chars consisted essentially of zinc oxide. (FIG. 13).

Figure 16:
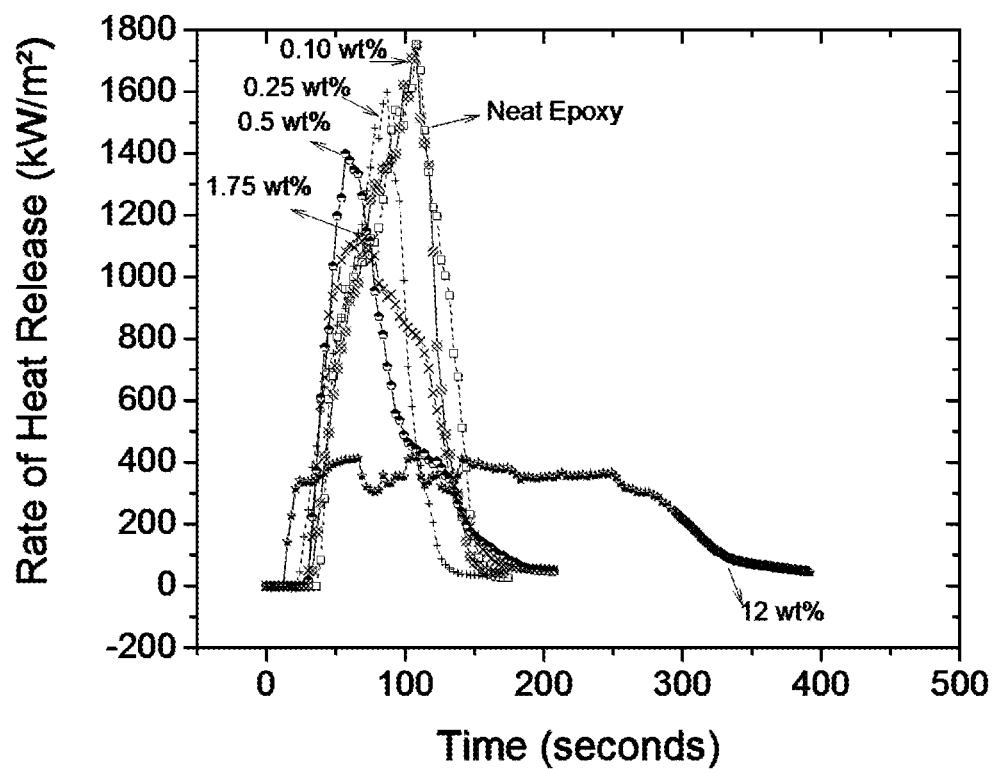
FIG. 16 shows a graphical illustration of the cone calorimeter measurements of the effect of different concentrations of the reaction product of dibutylamine and zinc acrylate on the flammability of epoxy resin prepared from Epoxy (Epon™ Resin 826)+Jeffamine® D230.
Figure 17:
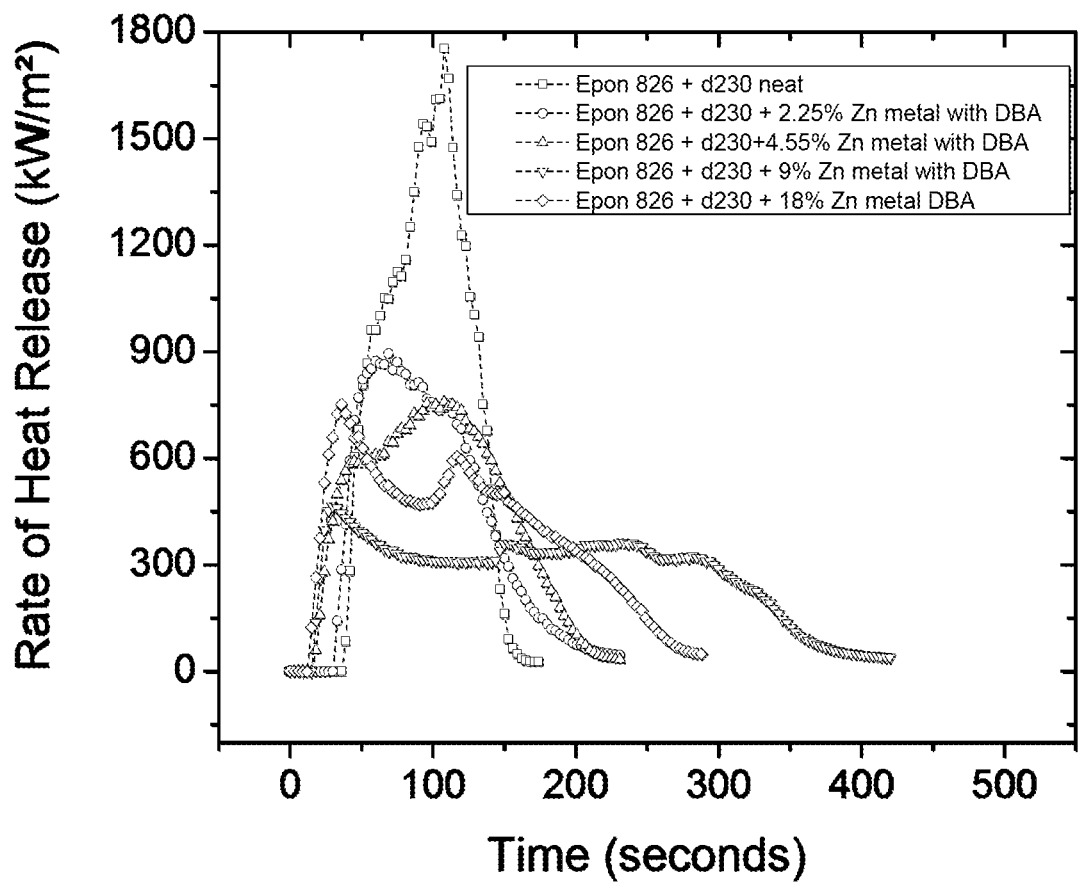
FIG. 17 shows a graphical illustration of the cone calorimeter measurements of the effect of different concentrations of the reaction product of dibutylamine and zinc acrylate on the flammability of epoxy resin prepared from Epoxy (Epon™ Resin 826)+Jeffamine® D230.

FIGS. 16 and 17 show graphical illustrations of the cone calorimeter measurements of the effect of different concentrations of the reaction product of dibutylamine and zinc acrylate on the flammability of epoxy resin prepared from Epoxy (Epon™ Resin 826)+Jeffamine® D230. The concentrations reported are the effective zinc concentration as percent by weight. All of the zinc compounds were prepared using dibutylamine as the amine raw material. The sample denoted 'Epoxy+d230 neat' is epoxy resin with no zinc additive.

Epoxy resin containing 2.5 weight percent zinc, as the product of N, N-di-n-butylamine with zinc acetate, showed a residual X-Ray diffraction peak (FIG. 4) and a second heat release rate peak (FIG. 9). The residual X-Ray diffraction peak is an indication of less than complete solubility of the zinc entity in the epoxy resin. According to Schartel and Hull, second heat release peaks can be caused by cracking of a char. This result indicates that char cracking and second heat release peaks may arise from incomplete solubility of the metal flame-retardant entity in the epoxy-amine resin.

Zinc-Amine Stoichiometry

The desired flame retardancy and continuity of the continuous film chars can be optimized by adjusting the ratio of amine to zinc acrylate. An increase in the concentration of zinc acrylate, while keeping the amine concentration constant, resulted in lower stoichiometry of amine to zinc and resulted in poorer dispersion and limited solubility in epoxy resin. This in turn resulted in higher peak heat release rate and less continuous char formation.

In a preferred embodiment, improved flame-retardant performance of epoxy resins results from compositions containing zinc compounds that are soluble in the epoxy resins. In yet another preferred embodiment, compounds formed by Michael addition of a primary or secondary amine to zinc acrylate, when soluble in an epoxy resin, confer improved flame-retardant performance on the epoxy resin.

Summary of the Cone Calorimetry Results Shown in FIG. 7

The zinc acrylate+dibutylamine composition clearly lowers the peak heat release rate over the entire burn time. This flame-retardant performance may be attributed to an effective char layer. Zinc oxide marginally lowers heat release and peaks at about the same burn time as the neat sample, which is indicative of an inefficient char possibly permeable to gases formed by pyrolysis and also to oxygen. This result is consistent with a char barrier that is only marginally effective in interrupting the fire triangle. Zinc borate peaks at a burn time that is earlier than the neat epoxy and thereafter the zinc borate sample shows inhibition. This result is consistent with zinc borate favoring a carbon char.

Summary of the Cone Calorimetry Results Shown in FIG. 9

Zinc citrate with dibutylamine in epoxy resin produces hazy compositions that show a combustion profile similar to zinc oxide, peaking at a similar burn time to the neat epoxy and showing only marginal flame-retardant performance. This is consistent with an inefficient char barrier which is permeable to gases formed by pyrolysis and also permeable to oxygen, and is only marginally effective in interrupting the fire triangle.

Zinc acetate+dibutylamine in epoxy resin produced compositions that are optically clear, but X-Ray diffraction reveals the presence of some residual crystals of zinc acetate. The compositions containing zinc acetate+dibutylamine in epoxy resins showed excellent flame-retardant performance initially, but then displayed a 'flare' in the late stages of the combustion process. Schartel and Hull indicate that a late flare is evidence of cracking of the char. This indicates that although zinc acetate+dibutylamine in epoxy was transparent, the excellent flame-retardant performance does not reach its ultimate potential due to a 'flare' late in the process. The late flare may be attributed to cracking of the char, which may be caused by the presence of residual crystals.

Epoxy resins containing zinc acrylate with butylamine or zinc undecylenate with dibutylamine are transparent samples in which no residual crystallinity was detected. Epoxy resins containing either 'zinc acrylate+dibutylamine' or 'zinc undecylenate+dibutylamine' showed excellent flame-retardant performance. Zinc undecylenate contains a larger hydrocarbon content than zinc acrylate. Therefore, zinc undecylenate has an intrinsically higher fuel content than zinc acrylate. It is noteworthy that the sample containing zinc undecylenate exhibited better flame-retardant performance than the sample that contained zinc acrylate. This may be evidence that zinc undecylenate+dibutylamine is more compatible within the epoxy resin than zinc acrylate+butylamine.

Zinc stearate+dibutylamine in epoxy resin showed excellent flame-retardant performance. The peak heat release rate was higher than similar samples containing zinc acrylate or zinc undecylenate and the time to ignition was shorter. The higher heat release rate and the lower time to ignition could be attributed to the higher hydrocarbon content of zinc stearate.

Example 2: The Effect of Zinc Compound Concentration on Flame-Retardant Performance Cone calorimetry was conducted on epoxy resin samples containing the reaction products of dibutylamine and zinc acrylate ranging in concentration from about 0.1 weight percent zinc to about 18 weight percent zinc. (Table 5 and FIGS. 16 and 17).

Reduction of peak heat release rates was evident at zinc concentrations of at least about 0.25 weight percent zinc. Peak heat release rate was reduced as the zinc concentration was increased to at least about 9 weight percent. Peak heat release rate for samples containing 9 weight percent zinc was lower than the peak heat release rate reduction for samples that contained 18 weight percent zinc, indicating that there is an optimal concentration of zinc which achieves the lowest heat release rate.

TABLE 5

The effects of concentration of zinc acrylate/dibutylamine compound on flame retardancy of epoxy-amine compositions

| Formulation | Standard (Epoxy-0%) Zn metal) | Sample1 (Epoxy-with 2.25% Zn metal) | Sample 2 (Epoxy-with 4.5% Zn metal) | Sample 3 (Epoxy with-9% Zn metal) | Sample 4 (Epoxy with-18% Zn metal) |
|---|---|---|---|---|---|
| Tig | 29 | 32 | 20 | 18 | 11 |
| PHRR | 1629 | 896 | 778 | 468 | 752 |
| tPHRR | 72 | 68 | 108 | 31 | 36 |
| THR (MJ/m2) | 79 | 91 | 98 | 112 | 109 |
| Physical State | Transparent | Transparent | Transparent | Transparent | Transparent |

In a preferred embodiment of the invention, soluble flame-retardant metal compounds, when dissolved in flammable materials, cause reductions of smoke release and reductions in carbon monoxide and carbon dioxide emissions during combustion.

Reduction of Smoke, Carbon Monoxide, and Carbon Dioxide Emissions

Figure 18:
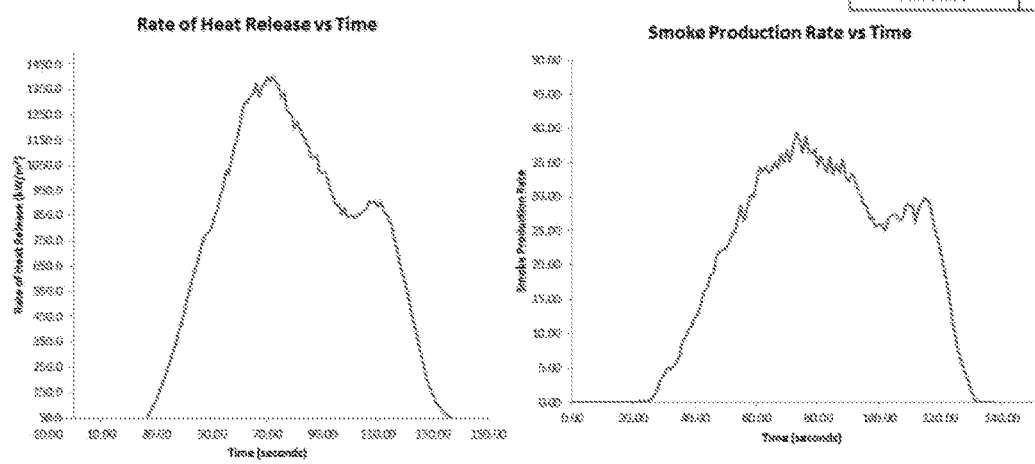
FIG. 18 shows a graphical illustration of the cone calorimeter measurements of the heat release, smoke, carbon dioxide, and carbon monoxide evolution on the combustion of resin prepared from Epoxy (Epon™ Resin 826)+Jeffamine® D230.
Figure 19:
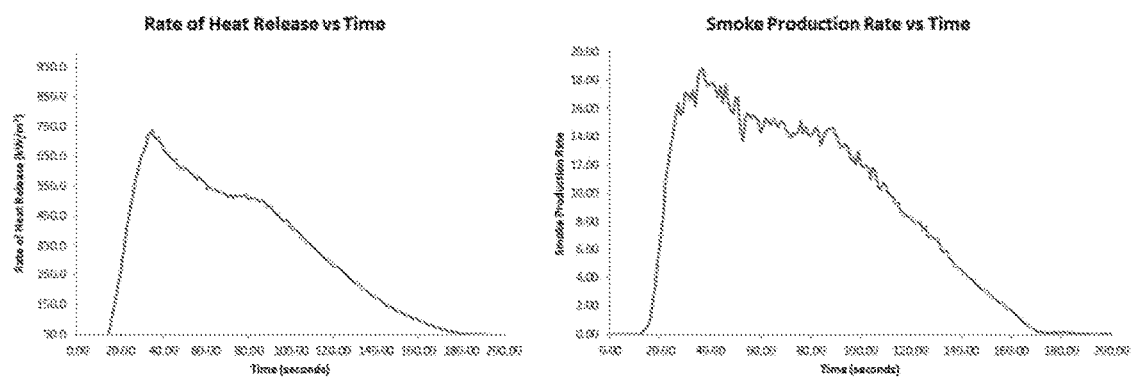
FIG. 19 shows a graphical illustration of the cone calorimeter measurements of the effect of the reaction product of dibutylamine and zinc acrylate on the heat release, smoke, carbon dioxide, and carbon monoxide evolution on the combustion of resin prepared from Epoxy (Epon™ Resin 826)+Jeffamine® D230.

Cone calorimetry was conducted on epoxy resin samples containing the reaction product of dibutylamine and zinc acrylate at 6 weight percent zinc. (FIGS. 18 and 19). FIG. 18 shows a graphical illustration of the cone calorimeter measurements of the heat release, smoke, carbon dioxide, and carbon monoxide evolution on the combustion of resin prepared from Epoxy (Epon™ Resin 826)+Jeffamine® D230. FIG. 19 shows a graphical illustration of the cone calorimeter measurements of the effect of the reaction product of dibutylamine and zinc acrylate on the heat release, smoke, carbon dioxide, and carbon monoxide evolution on the combustion of resin prepared from Epoxy (Epon™ Resin 826)+Jeffamine® D230.

The samples containing the soluble zinc acrylate/dibutylamine product showed significant reduction of the peak heat release rate, smoke evolution, and carbon monoxide release rate, up to about one-half of the amounts or values of those for the untreated epoxy resin or untreated flammable material. Additionally, the samples containing the soluble zinc acrylate/dibutylamine product showed significant reduction of the carbon dioxide release rate, up to about two-thirds of the amounts or values of those for the untreated epoxy resin or untreated flammable material.

The Institute of Pure and Applied Chemistry categorizes elements in a periodic table that consists of seven periods and eighteen groups. In a preferred embodiment, metal compounds efficient and useful as flame-retardants comprise flame-retardant metals that fall within Periods 3 and 4 and Groups 2 through 12 of the Periodic Table of the Elements. The term "flame-retardant metal" and "flame-retardant metal entity" as used herein is defined as a metal which is selected from the elements within Periods 3 and 4 and within Groups 2 through 12 of the Periodic Table of the Elements, or a combination thereof. Preferably, the metal or flame-retardant metal is selected from zinc, manganese, nickel, cobalt, calcium, and magnesium, or mixtures or a combination thereof.

Example 3: The Effect of Various Metal Compositions

Figure 20:
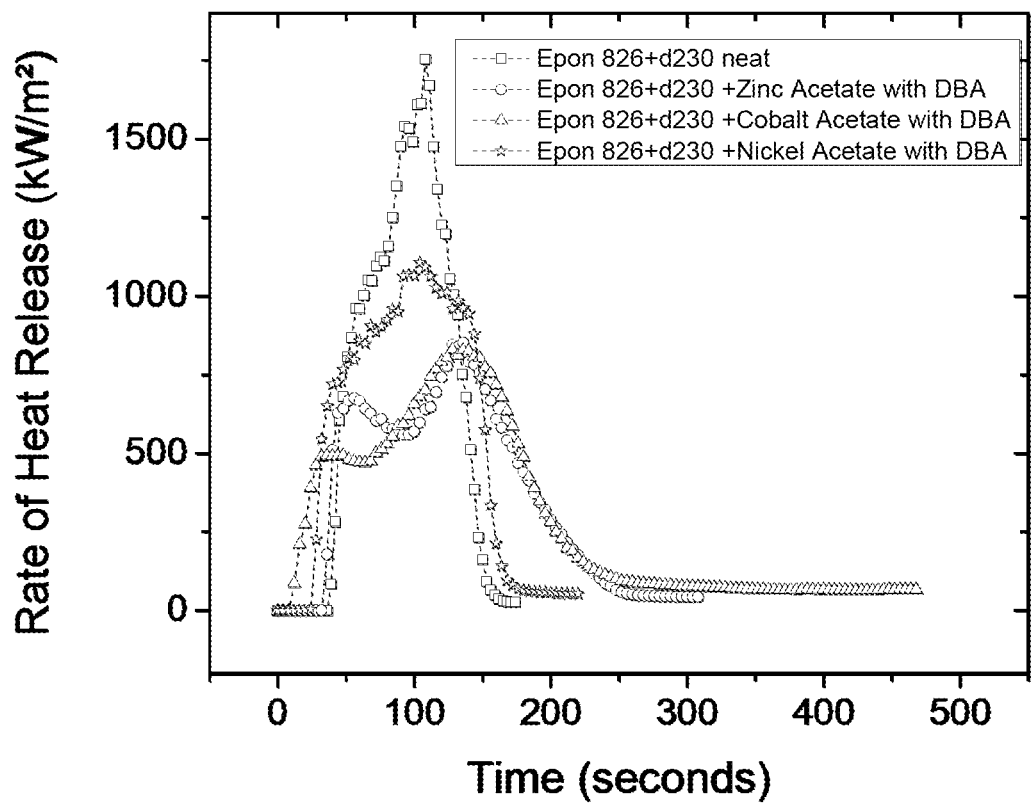
FIG. 20 shows a graphical illustration of the cone calorimeter measurements of the effect of reaction product of dibutylamine with zinc, cobalt, or nickel acetates on the flammability of epoxy resin prepared from Epoxy (Epon™

Compounds formed by combining dibutylamine with cobalt acetate or nickel acetate were soluble in epoxy-amine resin to yield transparent compositions. These compositions containing soluble cobalt and nickel complexes displayed significant reduction in the peak heat release rate upon combustion in a cone calorimeter. (FIG. 20). FIG. 20 shows a graphical illustration of the cone calorimeter measurements of the effect of reaction product of dibutylamine with zinc, cobalt, or nickel acetates on the flammability of epoxy resin prepared from Epoxy (Epon™ Resin 826)+Jeffamine® D230). All of the metal compounds were prepared using dibutylamine as the amine raw material. Each epoxy resin sample contained 2.25 weight % metal. The sample denoted 'neat' is epoxy resin with no metal additive.

Figure 14:
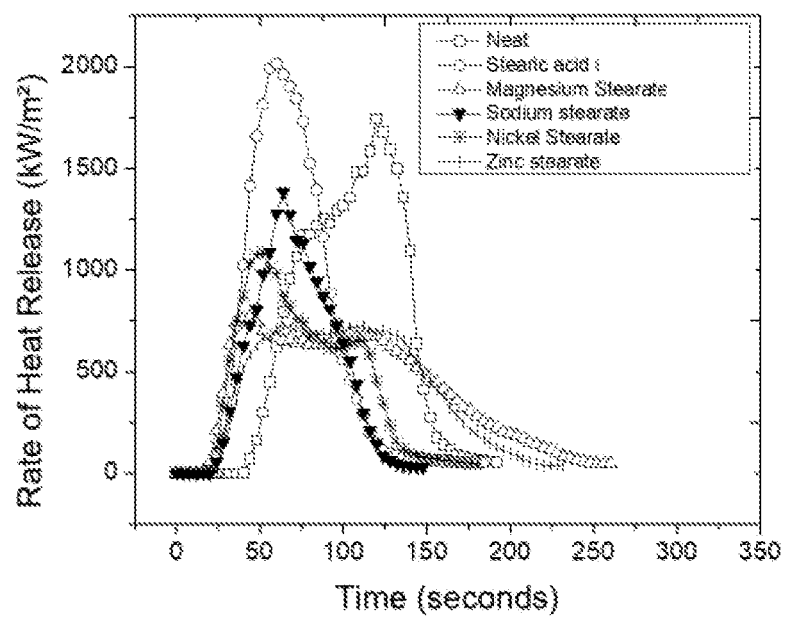
FIG. 14 shows a graphical illustration of the cone calorimeter measurements of the effect of stearates on the flammability of epoxy resin prepared from Epoxy (Epon™ Resin 826+Jeffamine® D230).
Figure 15:
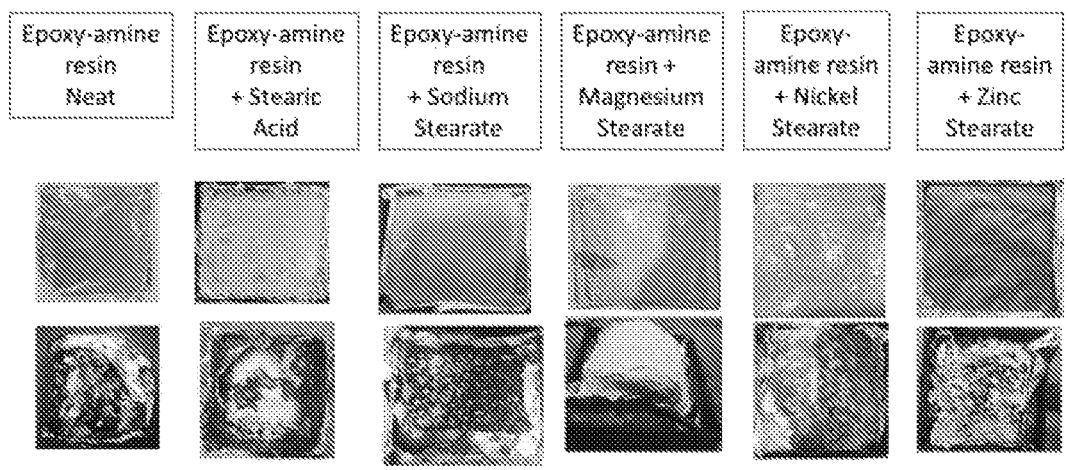
FIG. 15 shows a pictorial representation of samples of epoxy resin and epoxy resin containing stearates before and after burning in the cone calorimeter. Samples are shown above and the corresponding char is shown beneath each sample. The epoxy resin was prepared from Epon™ Resin 826 and Jeffamine® D230.

FIG. 14 shows a graphical illustration of the cone calorimeter measurements of the effect of stearates on the flammability of epoxy resin prepared from Epoxy (Epon™ Resin 826+Jeffamine® D230). Each epoxy resin sample contained 2.25% zinc. The material denoted as 'neat' is epoxy amine resin alone. FIG. 15 shows a pictorial representation of samples of epoxy resin and epoxy resin containing stearates before and after burning in the cone calorimeter. Samples are shown above and the corresponding char is shown beneath each sample. The epoxy resin was prepared from Epon™ Resin 826 and Jeffamine® D230. Each metal stearate sample contained 2.25% metal as the concentration in the resin. The results demonstrated that the improved flame-retardant effect extends to metals other than zinc and that solubility of the metal entity confers enhanced flame retardancy.

In a preferred embodiment, the improvement of flame retardancy by dissolving flame-retardant metal compounds within flammable materials is demonstrated by epoxy amine resins containing various metal stearates.

TABLE 6

The effects of adding stearates to epoxy-amine compositions

| Cone Calorimeter Measurement | Neat Epoxy Resin | Epoxy resin + Stearic Acid | Epoxy resin + Sodium Stearate | Epoxy resin + Magnesium Stearate | Epoxy resin + Nickel Stearate | Epoxy resin + Zinc stearate |
|---|---|---|---|---|---|---|
| Time to ignition (secs) | 42 | 24 | 24 | 21 | 22 | 25 |
| Peak Heat Release Rate (Kw/sq · m) | 1744 | 2016 | 1383 | 767 | 1081 | 729 |
| time to Peak heat release (sec) | 120 | 60 | 64 | 44 | 52 | 75 |
| Total Heat Release (MJ/sq · m) | 85.2 | 93.9 | 92 | 88 | 92 | 88 |
| Appearance | Transparent | Opaque, waxy | Opaque with bubbles | Transparent | Greenish, translucent | Transparent |

The epoxy-amine materials containing magnesium stearate and zinc stearate were transparent and the peak heat release (FIGS. 14 and 15) rate was lowered significantly. Epoxy-amine resins containing nickel stearate were translucent and the peak heat release rate was lowered significantly, but a pronounced peak in heat release occurred early in the combustion process. Incorporation of sodium stearate into epoxy amine resin resulted in an opaque material with slightly reduced peak heat release rate and a shorter time to reach the peak heat release rate. After combustion, there was essentially no char remaining from samples of neat epoxy resin and epoxy resin with stearic acid. Epoxy resin with magnesium stearate produced a char that was a continuous white film. Epoxy resin with zinc stearate produced a char that was a solid foam on top with a continuous film underneath. Epoxy resin with nickel stearate produced a char that was a semi-continuous film. Epoxy resin with sodium stearate produced a powdery char. Maximum improvement in lowering of peak heat release rate can be achieved when a continuous film char is formed during combustion. The continuity of the char film was observed to correlate with the presence of metal compounds that were soluble in the flammable material.

In a preferred embodiment, the improvement of flame retardancy by dissolving flame-retardant metal compounds within flammable materials is demonstrated by polyurethanes containing the reaction product of zinc acrylate and dibutylamine.

Example 4: Polyurethane Systems

Thermoset polyurethane composites were made using Sovermol 1092 (polyol), a product from BASF, and an isocyanate Desmodur W, a product from Bayer. Acetone was used as solvent.

Step 1: Small Molecule Soluble Flame-Retardant Metal Compound Synthesis

The reaction products of dibutylamine with zinc salts were prepared as described in Example 1. For this purpose, dibutylamine (DBA) was selected as the amine part of the complex for two reasons. The first reason was that the low viscosity of dibutylamine allowed the addition of more zinc acrylate to the mixture without adding a solvent such as acetone. The second reason was that, since dibutylamine has only one replicable hydrogen atom, two moles of butylamine react with one mole of zinc acrylate, which results in a zinc acrylate complex with excellent compatibility with the organic polymer matrix.

Step 2: Composition Fabrication

Polyurethanes were synthesized by reacting the selected polyol with the selected isocyanate in the presence of dibutyltin dilaurate as catalyst. The synthesized dibutylamine/zinc salts compounds were dissolved in xylene to achieve a mixture of about 10 wt % of solvent, and this mixture was then combined with the polyisocyanate prepolymer. This mixture was then added slowly to stoichiometric quantities of polyol and degassed prior to casting in a desired mold to cure at about 85° C. for about 12 hours. The samples were aged for at least 24 hours prior to test. The polyurethane sample that contained only zinc acrylate was opaque. The sample containing the dibutylamine/zinc acrylate complex was transparent.

Step 3: Evaluation of Flame-Retardant Performance

To compare the effect of dispersion, partial dispersion, and solubility on flame retardancy, comparative example compositions were made using only zinc acrylate mixed with polyol-isocyanate complex and subsequently compared, by cone calorimetry, with compositions made using the zinc acrylate/dibutylamine compound. Exemplary cone calorimetry results for the polyurethane compositions are shown in FIG. 21 and Table 7. FIG. 21 shows a graphical illustration of the cone calorimeter measurements of the effect of the reaction product of dibutylamine and zinc acrylate on the flammability of polyurethane prepared from stoichiometric ratios of polyol and isocyanate. The sample designated 'PU+Zinc Acrylate' consisted of zinc acrylate dispersed in the polyurethane. The sample containing the dibutylamine/zinc acrylate compound is signified by the key 'small molecule additive'. The polyurethane samples designated 'PU+Zinc Acrylate' and 'small molecule additive' each contained 2.25 weight % zinc. Addition of zinc acrylate alone to the polyurethane composition produced an opaque epoxy resin composition that resulted in reduction of the peak heat release rate, whereas addition of the zinc acrylate-dibutylamine compound produced a transparent composition that resulted in a significantly more pronounced reduction of the peak heat release rate. These results demonstrate that solubility of a flame-retardant metal compound in a flammable material, such as polyurethane for example, provides flame-retardant performance that is substantially improved over particulate dispersion of a metal entity in the flammable material. This reduction in peak heat release rate is likely due to the formation of a zinc oxide layer as a continuous film on top of the polymer substrate during combustion which retards the combustion process. Microscopic visual inspection of the chars showed that the char from the polyurethane compositions that contained zinc acrylate/dibutylamine compound was in the form of a continuous film. In contrast, the char from the composition that contained zinc acrylate without dibutylamine was in the form of a semi-continuous char. No char remained after combustion of the neat polyurethane.

TABLE 7

The effects of zinc acrylate and reaction products of dibutylamine with zinc acrylate on flame retardancy of polyurethane

| Formulation | Control (Polyurethane-0% Zn metal) | (Polyurethane-2.25% Zn metal as Acrylate) | (Polyurethane-2.5% Zn metal as dibutylamino compound of Zinc Acrylate) |
|---|---|---|---|
| Tig (s) | 32 | 30.5 | 31.5 |
| PHRR (KW/m2) | 1628.84 | 1237.33 | 726.909 |
| tPHRR (s) | 72 | 68 | 61 |
| THR (MJ/m2) | 78 | 86.5 | 96.0 |
| Physical state | Transparent | Opaque | Transparent |

In a preferred embodiment, the improvement of flame retardancy by dissolving flame-retardant metal compounds within flammable materials is demonstrated by polystyrene containing the reaction product of zinc acrylate and dibutylamine.

Example 5: Polystyrene Compositions

Preparation of Polystyrene-Containing Zinc Acrylate/Dibutylamine Compound:

Polystyrene was cast via a solution casting method. The neat polymer was dissolved in methylene chloride under stirring. The zinc acrylate/dibutylamine complex, prepared as described in Example 1, was diluted with methylene chloride and added to a solution of polystyrene under stirring and cast in a mold. The composition was held in an oven for 24 hours at 65° C. to evaporate the solvent and form a solid sample cast. The polystyrene cast containing only zinc acrylate was translucent. The polystyrene cast containing the dibutylamine/zinc acrylate complex was transparent. Polystyrene casts containing 2.5 weight percent zinc as zinc acrylate, with and without a stoichiometric amount of dibutylamine, were prepared and tested by cone calorimetry. Results are shown in FIG. 22 and Table 8. FIG. 22 shows a graphical illustration of the cone calorimeter measurements that show the effect of the reaction product of dibutylamine and zinc acrylate on the flammability of polystyrene. The sample designated 'Zinc+PS' consisted of zinc acrylate dispersed in the polystyrene. The sample containing the dibutylamine/zinc acrylate compound is signified by the key 'small molecule additive'. The polystyrene samples designated 'Zinc+PS' and 'small molecule additive' each contained 2.25 weight % zinc. Zinc acrylate decreased the peak heat release rate, but the zinc acrylate dibutylamine complex decreased the peak heat release rate substantially more than the zinc acrylate alone.

TABLE 8

The effects of zinc acrylate and zinc acrylate/dibutylamine compound on flame retardancy of polystyrene

| Formulation | Polystyrene 0% Zn | Polystyrene-2.25% Zn as zinc acrylate) | Polystyrene 2.5% Zn as dibutylamino compound of zinc acrylate) |
|---|---|---|---|
| Tig (s) | 38.5 | 35 | 29.5 |
| PHRR (KW/m2) | 1406.26 | 1148.42 | 819.74 |
| tPHRR (s) | 114.5 | 90 | 111.5 |
| THR (MJ/m2) | 91 | 97.6 | 95.5 |
| Physical State | Transparent | Translucent | Transparent |

In a preferred embodiment, the improvement of flame retardancy by dissolving flame-retardant metal compounds within flammable materials is demonstrated by the water-soluble polymer containing the reaction product of zinc acrylate and ethylenediamine.

Example 6: Polyethylene Oxide Compositions

Preparation of Zinc Acrylate-Amine Compound:

A small molecule additive was prepared from ethylene diamine and zinc acrylate in order to obtain an organometal salt-amine entity that would be soluble with the polyethylene oxide and its aqueous solution. Stoichiometric quantities of zinc acrylate were chosen such that only one of the hydrogen atoms per amine was reacted with the zinc in order to preserve the solubility of the complex towards water. Calculated quantities of ethylenediamine were added to a vial, followed by mixing excess water under stirring. Zinc acrylate powder was added slowly to the vial with agitation.

Polyethylene Oxide Compositions with Zinc Acrylate/Ethylenediamine:

Polyethylene oxide (PEO) was dissolved in water and under stirring at 60° C. The prepared zinc acrylate-ethylenediamine compound was then mixed into the PEO solution until dissolved, and the composition was cast in a mold.

Evaluation of Flame-Retardant Performance:

Polyethylene oxide casts containing 2.5 weight percent zinc as zinc acrylate, with and without a stoichiometric amount of ethylenediamine, were prepared and tested by cone calorimetry. Results are shown in FIG. 23 and Table 9. FIG. 23 shows a graphical illustration of the cone calorimeter measurements that show the effect of reaction product of ethylenediamine and zinc acrylate on the flammability of poly(ethylene oxide). The sample designated 'PEO+Zn Acrylate' consisted of zinc acrylate dispersed in the poly (ethylene oxide).

The sample containing the ethylenediamine/zinc acrylate compound is signified by the key 'small molecule additive'. The poly(ethylene oxide) samples designated 'PEO+Zn Acrylate' and 'small molecule additive' each contained 2.25 weight % zinc. Zinc acrylate decreased the peak heat release rate. The zinc acrylate/ethylenediamine compound decreased the peak heat release rate substantially more than the zinc acrylate alone. The results reveal that adding zinc acrylate as a soluble zinc/amine compound to the polymer had a substantially improved effect in reducing the peak heat release rate. Also for the material that contained poly(ethylene oxide) and the zinc-ethylenediamine compound, the char formed after the cone test was a continuous char. This preferred embodiment reveals that aqueous solutions of polyethylene oxide with a soluble zinc compound will retain flame-retardancy after the solvent, water for example, has been depleted or removed by, for example, evaporation. More generally, this result demonstrates that aqueous solutions of polymers containing soluble flame-retardant metal entities can retain significant flame-retardant properties after the water or solvent has evaporated or has been removed.

TABLE 9

The effects of zinc acrylate and zinc acrylate/dibutylamine compounds on flame retardancy of poly(ethylene oxide)

| Formulation | Poly (ethylene oxide) 0% Zn | (Polyethylene oxide)-2.25% Zn as zinc acrylate | (Polyethylene oxide)-2.25% Zn as zinc acrylate/dibutylamine compound |
|---|---|---|---|
| Tig (s) | 23.9 | 21.76 | 15.5 |
| PHRR (KW/m2) | 1749.8 | 1136.71 | 759.6 |
| tPHRR (s) | 77 | 99.5 | 159 |
| THR (MJ/m2) | 86 | 98.5 | 102.8 |
| Physical State | Transparent | Opaque | Transparent |

In summary, the results of the above examples demonstrate that substantially improved flame retardancy can be achieved by soluble zinc and other soluble flame-retardant metal entities or compounds incorporated into polymers ranging from thermoset epoxy resins to polyurethanes to thermoplastic polystyrene to water soluble poly(ethylene oxide), for example. In general, the present invention and results demonstrate that substantially improved flame-retardancy performance can be achieved if flame-retardant metal compounds are soluble in combustible or flammable materials.

The American National Standards Institute: Underwriters' Laboratories Standard for Tests for Flammability of Plastic Materials for Parts in Devices and Appliances, UL94-HB, describes a method to test the rate at which a standard horizontally-oriented bar of material burns when it is ignited from one end. A slow burn rating is given to a material that takes more than three minutes to burn four inches, which corresponds to a rate of burning of 33.9 mm per minute. The standard flammability of epoxy-amine resins containing no zinc salts were compared with epoxy-amine resins containing soluble zinc acrylate-dibutylamine complex of the invention by testing according to ASTM method UL 94 HB. All samples passed the UL 94 HB test. The rate of burning was decreased for samples of epoxy-amine resin with the addition of soluble zinc acrylate-dibutylamine compound of the invention. Moreover, the samples containing the zinc acrylate compound did not drip during burning whereas the sample with no added zinc complex produced flaming drips as it burned. The results of the UL-94-HB test are shown in Table 10.

TABLE 10

ASTM method UL-94 HB testing of zinc acrylate/dibutylamine compound on the standard flammability of epoxy-amine resin

| Sample Name | Time to reach Point A (s) | Time to reach Point B (s) | Linear Burning rate mm/minute |
|---|---|---|---|
| Control 0 wt % Zn | 40 | 281 | 21.4 |
| 2.5 wt % Zn | 62 | 358 | 16.8 |
| 4.5 wt % Zn | 69 | 494 | 12.1 |

TABLE 10-continued

ASTM method UL-94 HB testing of zinc acrylate/dibutylamine compound on the standard flammability of epoxy-amine resin

| Sample Name | Time to reach Point A (s) | Time to reach Point B (s) | Linear Burning rate mm/minute |
|---|---|---|---|
| 6 wt % Zn | 71 | 424 | 14.2 |
| 9.5 wt % Zn | 70 | 379 | 15.8 |
| 18 wt % Zn | 60 | 368 | 16.3 |

The soluble flame-retardant metal moieties behaved as plasticizers for the polymers in which they were dissolved. The glass transition temperature of the epoxy resin was decreased by the addition of the compound of zinc acrylate and dibutylamine. (FIG. 24 and Table 11). FIG. 24 shows a graphical illustration of the Differential Scanning Calorimetry of epoxy resin samples with various levels of the zinc acrylate/dibutylamine compound.

TABLE 11

The effect of zinc acrylate/dibutylamine compound on the glass transition temperature of epoxy-amine resin as determined by differential scanning calorimetry

| Zinc metal content of Epoxy Resin | Tg |
|---|---|
| 0 | 91° C. |
| 2.5 wt. percent | 83° C. |
| 9 wt. percent | 66° C. |

Plasticization of the epoxy resin was demonstrated by compressive tensile tests in which polymer cylinders were subjected to compression along the axis of the cylinder. The soluble zinc acrylate/dibutylamine compound conferred a decrease in initial Young's Compressive Modulus followed by a distinct yield stress and plastic flow. (FIG. 25 and Table 12). FIG. 25 shows a graphical illustration of the compressive tensile tests that show the effect of β-amino ester complex of zinc acrylate on the mechanical properties of an Epoxy (Epon™ Resin 826)+Jeffamine® D230. The concentrations reported are percentage by weight as zinc. The value of the yield point decreased with increase in soluble zinc content. Polymers with soluble zinc contents of 9.1 weight percent and higher displayed brittle fracture when compressed.

TABLE 12

The effect of zinc acrylate/dibutylamine compound on the Young's Modulus and yield stress of epoxy resin as determined by compressive testing

| Sample | Initial Modulus (Mpa) | Yield Stress (MPA) |
|---|---|---|
| Neat | 1125 | 102 |
| 0.5 wt % | 849 | 82 |
| 1.75 wt % | 792 | 74 |
| 2.25 wt % | 784 | 68 |
| 4.5 wt % | 684 | 58 |
| 9.1 wt % | Shattered | |
| 18 wt % | Shattered | |

A preferred embodiment comprises a self-healing flame-retardant copolymer network wherein a flame-retardant metal is incorporated into the polymer molecular structure by means of coordination bonds.

Example 7: Self-Healing Flame-Retardant Polymer Networks Comprising Polymer Chains Crosslinked Through Coordination Bonds with Metal Ions Polymers with self-healing properties can be achieved by preparing polymer networks within which the polymer molecular chains are crosslinked through coordination bonds with metals. The inventors discovered that novel flame-retardant polymeric compositions can be achieved by homogeneously distributing metal entities throughout polymer network structures by forming chemical coordination bonds between flame-retardant metal entities and ligands on the polymer chains. Moreover, these new flame-retardant polymeric networks formed by metal coordination can exhibit autonomous self-healing properties. The formation of self-healing flame-retardant polymeric networks is exemplified by a polyurethane, for example, that is crosslinked by zinc. The polyurethane is formed by the reaction of a suitable isocyanate and a monomer formed by the Michael addition reaction of zinc acrylate with an alkanolamine.

In one specific example, shown in FIGS. 26 and 27, a tetrafunctional monomer is prepared by reacting zinc acrylate with diethanolamine. FIG. 26 shows a graphical illustration of the cone calorimeter measurements that show the effect of reaction product of diethanolamine and zinc acrylate on the flammability of a self-healing polyurethane. The concentrations of zinc acrylate/diethanolamine compound are shown as percentages as zinc. FIG. 27 by comparison shows a graphical illustration of the cone calorimeter measurements that show the effect of methyl acrylate and hexanediol diacrylate additives to polyurethane. The diol monomer formed from the reaction of zinc acrylate with diethanolamine is further reacted with an isocyanate monomer, for example, a hexamethylene diisocyanate, to form the polyurethane network structure. Optionally, the tetrafunctional monomer can be combined with a monofunctional alcohol, a diol, or a triol, or other multifunctional alcohol, to fine tune the network structures and the properties that are derived therefrom.

For example, a tetrafunctional monomer can be prepared by reacting about 49.45 parts of zinc acrylate with about 50.55 parts of diethanolamine. Self-healing polymers can be prepared by reacting stoichiometric quantities of the synthesized tetrafunctional monomer, diethanolamine, and hexamethylene diisocyanate. The network crosslink density of the resulting polyurethane networks is determined by the proportion of multifunctional zinc-coordinate monomer that is included in the reaction to form the polyurethane.

Exemplary polyurethanes were synthesized by reacting stoichiometric quantities of hexamethylene diisocyanate with diethanolamine and the tetrafunctional monomer prepared by Michael addition of zinc acrylate to diethanolamine. The polyurethane products were transparent and displayed autonomous self-healing characteristics whereby the scratched surface of the polyurethane would spontaneously heal and the healed surface would be free of scratches. Moreover, if the material form was fractured or cut into separate pieces, the form would spontaneously recover its former state by merely pressing the fractured surface together for sufficient time for the cut surface to heal and adhere to one another. Transparent rods of the self-healing material were prepared to the dimensions about 1 cm. in diameter and about three inches in length. The rods were cut in half and the cut faces were pressed together by squeezing them between thumb and forefinger. The rods were then left untouched under ambient conditions. Some spontaneous self-healing of the rods was apparent immediately and, after about 15 minutes, the rods could be stretched to about 120 percent of their original length before fracturing. When the rods were left untouched for 24 hours, the rods and the cut faces healed sufficiently to allow extensions of the rods to about twice their original lengths, with no rupture of the healed cut. Further, the healed rods could be bent in double without rupturing. Polyurethanes prepared identically, except without the zinc metal, were clear plastics that did not exhibit self-healing characteristics.

Scratches, approximately 2 cm long and 1 mm deep, were made in the self-healing rods. Upon slight compression of the rods, simply using finger and thumb, the scratches spontaneously healed under ambient temperature and pressure.

Evaluation of Flame-Retardant Performance of Self-Healing Network Polymers

To compare the effect on flame retardancy of metal-coordinates chemically bonded to the polymer chains, comparative example compositions were made with varying quantities of the tetrafunctional zinc monomer. Exemplary cone calorimetry results for the polyurethane compositions are shown in FIG. 26 for samples that contained respectively 2.5, 4.5 and 9.5 weight percent zinc. Comparison with the polyurethane that contained no zinc shows that incorporation of the metal as a coordination complex reactive monomer results in pronounced reduction in the peak heat release rate. This reduction in peak heat release rate was likely due to the conversion of zinc acrylate to zinc oxide forming a continuous layer on top of the polymer substrate that slows the combustion process. Microscopic visual inspection of the chars showed that the chars from the polyurethane compositions that contained zinc acrylate amine complex were in the form of continuous films. In contrast, there was no char from the composition that contained no zinc monomer.

Control samples, in which methyl acrylate or hexanediol diacrylate was substituted for the zinc coordination complex, showed a higher peak heat release rate, distinctly reduced time to peak heat release, and a much shorter time to complete combustion. (FIG. 27).

The present invention provides compositions and methods to produce such novel compositions having greatly enhanced flame-retardancy when flame-retardant metal moieties are soluble in flammable materials.

All parameters presented herein including, but not limited to, sizes, dimensions, times, temperatures, pressures, amounts, quantities, ratios, weights, volumes, and/or percentages, and the like, for example, represent approximate values. Recitations of numerical values and/or numerical ranges can be read to include the term 'about'. Further, references to 'a' or 'an' concerning any particular item, component, material, or product is defined as at least one and could be more than one. The terms 'comprises' and 'includes' and variations thereof are not to have a limiting meaning.

The above detailed description is presented to enable any person skilled in the art to make and use the invention. Specific details have been revealed to provide a comprehensive understanding of the present invention and are used for explanation of the information provided. These specific details, however, are not required to practice the invention, as is apparent to one skilled in the art. Descriptions of specific applications, analyses, materials, components, dimensions, and calculations are meant to serve only as representative examples. Various modifications to the preferred embodiments may be readily apparent to one skilled in the art, and the general principles defined herein may be applicable to other embodiments and applications while still remaining within the scope of the invention. There is no intention for the present invention to be limited to the embodiments shown and the invention is to be accorded the widest possible scope consistent with the principles and features disclosed herein.

While various embodiments of the present invention have been described above and in the attached documents, it should be understood that they have been presented by way of example and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. All embodiments herein can be made without undue experimentation in light of the disclosure. The Applicants have described the preferred embodiments of the invention, but it should be understood that the broadest scope of the invention includes such modifications as additional or different methods and materials. Many other advantages of the invention will be apparent to those skilled in the art from the above descriptions, reference documents, and the subsequent claims. Thus, the present invention should not be limited by any of the above-described exemplary embodiments.

The process, apparatus, system, methods, products, compositions, and compounds of the present invention are often best practiced by empirically determining the appropriate values of the operating parameters, or by conducting simulations to arrive at best design for a given application. Accordingly, all suitable modifications, combinations, and equivalents should be considered as falling within the spirit and scope of the invention.

REFERENCES

1. Morgan, A. B., Gilman, J. W., An overview of flame retardancy of polymeric materials: application, technology, and future directions, Fire and Materials, 2013, volume 37, p. 261.
2. M. H. Hirschler, Flame-retardants and their associated toxicity, Fire protection Engineering, Q4, 2015.
3. Babrauskas V, Harris R H, Gann R G, Levin B C, Lee B T, Peacock R D, Paabo M, Tilley W, Yoklavich M F, Clark, HM. Fire hazard comparison of fire-retarded and non-fire-retarded products. US Department of Commerce National Bureau of Standards Special Publication #749, 1988.
4. Walter W. Focke, Dan Molefe, F. J. W. Labuschagne, Shatish Ramjee, The influence of stearic acid coating on the properties of magnesium hydroxide, hydromagnesite, and hydrotalcite powders, J. Mater. Sci. (2009), 44, 6100-6109.
5. Grand A F, Wilkie C A (eds). Fire Retardancy of Polymeric Materials. Marcel Dekker, Inc. NY: NY, 2000. ISBN 0-8247-8879-6.
6. Rakotomalala, M.; Wagner, S.; Döring, M. Recent Developments in Halogen Free Flame-Retardants for Epoxy Resins for Electrical and Electronic Applications. Materials 2010, 3 (8), 4300-4327.
7. Siddiqi M A, Laessig R H, Reed K D. Polybrominated diphenyl ethers (PBDEs): new pollutants-old diseases, Clin Med Res. 2003 October; 1(4):281-90.
8. De Witt, C. A. Brominated Flame-retardants; Swedish environmental protection agency: Stockholm, Sweden, 2000.

9. Lu, S—H., Recent developments in the chemistry of halogen-free flame-retardant polymers, Prog. Polym. Sci., 27, (2002), 1661-1712.
10. Pauquet, J-R. et al., FLAME-Retardants, WO 2005/118697 A1, 15 Dec. 2005.
Assigned to Ciba-Geigy Holdings.
11. Schartel, B. Phosphorus-Based Flame Retardancy Mechanisms Old Hat or a Starting Point for Future Development? Materials 2010, 3 (10), 4710-4745.
12. Pawlowski K H. Schartel B. Flame retardancy mechanisms of triphenyl phosphate, resorcinol bis(diphenyl phosphate) and bisphenol A bis(diphenyl phosphate) in polycarbonate/acrylonitrile-butadiene-styrene blends. Polymer International 56:1404-1414.
13. Braun U, Balabanovich A1. Schartel A, Knoll U, Artner J, Ciesielski M, Doring M, Perez R, Sandler J K W, Alstadt V, Hoffmann T, Pospiech D. Influence of oxidation state of phosphorus on the decomposition and fire behavior of flame-retarded epoxy resin composites. Polymer 2006; 47:8495-8508.
14. Zhang, S. et al.; A review of flame-retardant polypropylene fibres, Prog. Polym. Sci. 28, (2003), 1517-1538.
15. Lu, S—H., Recent developments in the chemistry of halogen-free flame-retardant polymers, Prog. Polym. Sci., 27, (2002), 1661-1712.
16. Laoutid, F.; Bonnaud, L.; Alexandre, M.; Lopez-Cuesta, J.-M.; Dubois, P. New Prospects in Flame-retardant Polymer Materials: From Fundamentals to Nanocomposites. Mater. Sci. Eng. R Rep. 2009, 63 (3), 100-125.
17. Centers for Disease Control and Prevention, Polybromninated diphenyl ethers and polybroninatedbiphenylsfactsheet, CDC 24/7, Saving lives protecting people.
18. Consumer Product Safety Commission Staff Assessment on the toxicology excellence for risk assessment report, Flame-retardant assessment database, Dec. 17, 2015, rv Jan. 6, 2016.
19. Consumer Product Safety Commission Staff Statement on the toxicology excellence for risk assessment report, Environmental concentrations and consumer exposure data for selected flame-retardants, (TBB, TBPH, TBBPA, ATO), Aug. 13, 2015.
20. EPA, Q&A consumer factsheet on flame-retardants, 12 Jun. 2014. U.S. EPA Design for the environment, Flame-retardants used in flexible polyurethane foam: an alternatives assessment update, EPA 744-R-15-0002, August 2014.
21. National Institute of Environmental Health Sciences, Flame-retardants, www.niehs.nih.gov, July 2016.
22. Lu, S—H., Recent developments in the chemistry of halogen-free flame-retardant polymers, Prog. Polym. Sci., 27, (2002), 1661-1712.
23. Horacek. H., Grabner, R.; Advantages of flame-retardants based on nitrogen compounds, *Polymer Degradation and Stability,* 54, (1996), 205-215.
24. Fabien Carpentier, Serge Bourbigot, Michel Le Bras, Rene Delobel, Michel Foulon, Charring of fire retarded ethylene vinyl acetate copolymer—magnesium hydroxide/zinc borate formulations, Polymer Degradation and Stability, 69, (2000), 83-92.
25. Beyer, G. Nanocomposites: A New Class of Flame-retardants for Polymers. Plast. Addit. Compd. 2002, 4 (10), 22-28.
26. Gui, H.; Zhang, X.; Liu, Y.; Dong, W.; Wang, Q.; Gao, J.; Song, Z.; Lai, J.; Qiao, J. Effect of Dispersion of Nano-Magnesium Hydroxide on the Flammability of Flame-retardant Ternary Composites. Compos. Sci. Technol. 2007, 67 (6), 974-980.
27. Manzi-Nshuti, C.; Wu, Y.; Nazarenko, S. A Comparative Study of the Fire Retardant Effect of Several Metal-Based Compounds Added to an Epoxy-Amine Thermoset. In *Fire and Polymers VI: New Advances in Flame-retardant Chemistry and Science*; Morgan, A. B., Wilkie, C. A., Nelson, G. L., Eds.; American Chemical Society, Series Ed.; American Chemical Society: Washington, D C, 2012; Vol. 1118, pp 83-96.
28. Lu, S—Y., Recent developments in the chemistry of halogen-free flame-retardant polymers, Prog. Polym. Sci., 27, (2002), 1661-1712.
29. Chiang, W. et al.; Polymer blends with modified coupling agent, J. Appl. Polym. Sci. (1999), 71, 37-44.
30. Chiang, W. et al.; Polymer blends with modified coupling agent, J. Appl. Polym. Sci. (1998), 68, 865-874.
31. Najafi-Mohajeri, N. et al.; Synthesis and properties of new ferrocene-modified urethane block copolymers, J. Appl. Polym. Sci., (2000), 76, 1847-1856.
32. Galletti. F., et al.; Low-smoke self-extinguishing cable and flame-retardant composition comprising natural magnesium hydroxide, U.S. Pat. No. 8,097,809, Jan. 17, 2012, assigned to Prysmian Cavi e Sistemi Energia S.R.L. (Milan, IT).
33. Allen: Richard C., Transmission cable having a nonhalogenated jacket formulation, U.S. Pat. No. 5,378,856, Jan. 3, 1995; Assigned to Belden Wire & Cable Company (Richmond, IN).
34. Youn, H. S. et al.; Polyester resin compound, U.S. Pat. No. 4,960,812; Oct. 2, 1990; Sam Yang Co., Ltd. (Seoul, KR).
35. Kleiner, L., et al. Flame-retardant thermoplastic molding compositions of high electroconductivity, U.S. Pat. No. 4,596,669, Jun. 24, 1986, assigned to Mitech Corporation (Willoughby, OH).
36. Haley; Jeffrey Charles et al.; Polymer Composition for Use in Cables, U.S. Patent Application 20190002677, Jan. 3, 2019, assigned to Celanese EVA Performance Polymers Corporation, Irving TX.
37. Tajiri, Koji et al.; Flame-retardant nylon carpet and method for manufacturing the same, U.S. Patent Application 20050142327, Jun. 30, 2005.
38. Chen, X. et al.; Surface modification of magnesium hydroxide and its application in flame-retardant polypropylene composites; J Mater Sci., (2009), 44, 1324-1332.
39. Braun U, Bahr H, Sturm H, Schartel B. Flame retardancy mechanisms of metal phosphinates and metal phosphinates in combination with melamine cyanurate in glass-fiber reinforced poly(1,4-butylene terephthalate): the influence of metal cation. Polymers for Advanced Technologies 2008; 19:680-692.
40. Watanabe et al.; Flame-retardant resin composition, U.S. Pat. No. 5,364,899, Nov. 15, 1994, assigned to Denki Kagalru Koguo Kabushiki Kaisha, Tokyo, Japan.
41. Kornberg, N. et al.; Flame-retardant compositions, U.S. Pat. No. 5,045,618, Sep. 3, 1991, assigned to Bromine Compounds Ltd. (Beer Sheva, IL).
42. Sakurada, I. et al.; Method for manufacturing heat-resistant and flame-retardant synthetic fiber, U.S. Pat. No. 4,212,649, Jul. 15, 1980; assigned to Japan Atomic Energy Research Institute (Tokyo, JP).
43. Lomakin, S. M.; et al.; Polypropylene flame-retardant system based on $Si-SnCl_2$, Int. J. Polym. Mater., 1996, 32 (1-4), 203-211.
44. Lomakin, S. M.; et al.; New types of ecologically safe flame-retardant systems for polymethylmethacrylate, Int. J. Polym. Mater., 1996, 32 (1-4), 213-220.

45. Zaikov, J. E.; Polymer flame retardancy: a new approach, J. Appl. Polym. Sci., 1998, 68, 715-725.
46. Jayakody, C., A cone calorimetric study of flame-retardant elastomeric polyurethane modified with siloxanes and commercial flame-retardant additives, J. Fire Sci., 1998, 16, 351-382.
47. MacLaury, M. R. et al.; Flame-retardant compositions and coated article, U.S. Pat. No. 4,273,691, Jun. 16, 1981, assigned to General Electric Company (Schenectady, NY).
48. KOHRI; Haruka et al.; Flame-retardant resin composition and metal, U.S. Patent Application 20180371220, Dec. 27, 2018, assigned to Fujikura Ltd. Tokyo, JP.
49. Taira; Seiichi, et al., Flame-retardant resin composition and metal, U.S. Patent Application 20180362744, Dec. 20, 2018, assigned to Fujikura Ltd. Tokyo, JP.
50. Taira; Seiichi, et al., Flame-retardant resin composition and metal, U.S. Patent Application 20180355157, Dec. 13, 2018, assigned to Fujikura Ltd. Tokyo, JP.
51. U.S. Pat. No. 9,982,119, May 29, 2018. Huruka Kohri et al., assigned to Fujikura Ltd.
52. Thomas, N. L.; Zinc compounds as flame-retardants and smoke suppressants for rigid PVC, Plastics Rubber and Composites, 2003, 32, 413-419.
53. Formicola, C., De Fenzo, A., Zarrelli, M., Giordano, M., Antonucci, V., Zinc-based compounds as smoke suppressant agents for an aerospace epoxy matrix, Polyn Int., 2011, 60, 304-311.
54. Chen, T. et al.; Synergistic benefits of metal hydroxides and zinc borate in fire retardant cable and wire performance compounds, https://www.hubermaterials.com/userfiles/Synergistic_Benefits_of_Metal_Hydroxides_and_Zinc_Borate_in_Flame_Retardant_Wire_and_Cable_Performance_Compounds.pdf
55. Lee, E. B. et al.; Fire retardant cables formed from halogen-free and heavy metal-free compositions, U.S. Patent Application 20180355250, Dec. 13, 2018, assigned to General Cable Technologies Corporation, KY.
56. B. Schartel and T. R. Hull, Development of fire-retarded materials—Interpretation of cone calorimeter data, Fire and Materials, 2007; volume 31, pp. 336-37.

What is claimed is:

1. A flame-retardant composition comprising:
at least one metal complex, formed from a reaction of a metal salt and a primary or a secondary amine,
wherein the at least one metal complex is sufficiently soluble in a flammable material to impart or enhance a char forming property to the flammable material upon heating the flame-retardant composition,
the metal complex comprises a metal selected from the group consisting of metal from periods 3 and 4 of the Periodic Table of the Elements, a metal from groups 2 through 12 of the Periodic Table of Elements, and any combination thereof; and
the flammable material comprises at least one polymer selected from the group consisting of a thermoset polymer, a thermoplastic polymer, a water-soluble polymer, a water-swellable polymer, and any combination thereof.

2. The flame-retardant composition of claim 1, wherein the flame-retardant composition comprises from about 0.2 to about 25 percent by weight, as metal, of the at least one metal complex.

3. The flame-retardant composition of claim 1, wherein the flame-retardant composition is optically transparent, and an effective amount of visible light can pass through the flame-retardant composition.

4. The flame-retardant composition of claim 1, wherein the flame-retardant composition is autonomously self-healing and the at least one metal complex is distributed homogenously throughout a network structure of the at least one polymer by formation of chemical coordination bonds between the at least one metal complex and ligands on polymer chains of the at least one polymer.

5. The composition of claim 1, wherein the primary or secondary amine comprises dibutylamine.

6. The flame-retardant composition of claim 1, wherein the metal salt is selected from the group consisting of zinc acetate, zinc acrylate, zinc citrate, zinc undecylenate, zinc stearate, nickel acetate, cobalt acetate, and manganese acetate.

7. The flame-retardant composition of claim 1, wherein the flame-retardant composition upon heating and combustion produces a continuous or semi-continuous metal oxide char film barrier.

8. The composition of claim 7, wherein the primary or secondary amine is present in an effective amount to enhance the dissolvability and/or solubility of the flame-retardant metal complex within the flammable material and improve a desired flame retardancy of the flame-retardant composition and improve a continuity of the metal oxide char film barrier, both relative to a same flame retardant composition without the primary or secondary amine.

9. The composition of claim 7, wherein the metal oxide char film barrier provides a heat release rate, smoke evolution, a carbon monoxide release rate and a carbon dioxide release rate substantially less than those rates released, emitted, and/or evolved by untreated flammable material without the flame-retardant composition.

10. A method of preparing a flame-retardant composition comprising steps of:
dissolving at least one flame-retardant metal complex with a primary or secondary amine within a solid solution of a flammable material to form a flame-retardant material, wherein the metal is selected from the group consisting of a metal from period 3 and 4 of the Periodic Table of the Elements, a metal from group 2 through 12 of the Periodic Table of the Elements, and any combination thereof; and
the flammable material is a polymer selected from the group consisting of a thermoset polymer, a thermoplastic polymer, a water-soluble polymer, a water-swellable polymer, and any combination thereof.

11. The method of claim 10, wherein the flame-retardant composition is comprises from about 0.2 to about 25 percent by weight of metal, of the at least one flame-retardant metal complex.

12. The method of claim 10, wherein the flame-retardant composition is substantially optically transparent so that an effective amount of visible light can pass through the composition.

13. The method of claim 10, wherein the flame-retardant composition is autonomously self-healing and the at least one flame-retardant metal complex is distributed homogenously throughout a network structure of the polymer by formation of chemical coordination bonds between the at least one flame-retardant metal complex and ligands on polymer chains of the polymer.

14. The method of claim 10, wherein the at least one primary or secondary amine is present in the metal complex in an effective amount to enhance the dissolvability and/or solubility of the flame-retardant metal complex within the flammable material and to improve a desired flame retardancy of the flame-retardant composition and improve a continuity of the metal oxide char film barrier both relative to a same flame retardant composition without the primary or secondary amine.

15. The method of claim 10, wherein the flame-retardant composition upon heating and combustion produces a continuous or semi-continuous metal oxide char film barrier.

16. The method of claim 15, wherein the metal oxide char film barrier provides a heat release rate, smoke evolution, a carbon monoxide release rate and a carbon dioxide release rate substantially less than those rates released, emitted, or evolved by untreated flammable material without the flame-retardant composition.

17. A method of improving the flame-retardant properties of a flammable material comprising dissolving the flame-retardant composition of claim 1 in a solid solution of the flammable material.

18. The method of claim 17, wherein the flammable material is polymeric and the flame-retardant composition is substantially optically transparent so that an effective amount of visible light can pass through the composition, the flame retardant composition is autonomously self-healing and the at least one flame-retardant metal complex is distributed homogenously throughout a network structure of the polymeric flammable material by formation of chemical coordination bonds between the at least one flame-retardant metal complex and ligands on polymer chains of the polymeric flame-retardant material.

19. The method of claim 18, wherein the polymeric flammable material is selected from the group consisting of a coating, a lens, a finish, an insulation, apparel, a building material, and a construction material.

20. A flame-retardant material comprising:
a flammable material selected from the group consisting of a thermoset polymer, a thermoplastic polymer, a water-soluble polymer, a water-swellable polymer, and a combination thereof; and
flame-retardant composition comprising at least one metal complex formed from a reaction of a metal salt and a primary or a secondary amine dissolved in a solid solution of the flammable material, wherein the at least one metal complex is sufficiently soluble in the flammable material to impart or enhance a char forming property to the flammable material upon heating the flame-retardant material, and the metal complex comprises a metal selected from the group consisting of a metal of periods 3 and 4 of the Periodic Table of the Elements, a metal from groups 2 through 12 of the Periodic Table of Elements, and any combination thereof.

* * * * *